(12) United States Patent
Satori et al.

(10) Patent No.: US 6,820,867 B2
(45) Date of Patent: *Nov. 23, 2004

(54) FLUID-SEALED ANTI-VIBRATION DEVICE

(75) Inventors: Kazutoshi Satori, Saitama (JP); Toru Sakamoto, Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 32 days.

This patent is subject to a terminal disclaimer.

(21) Appl. No.: 09/930,296

(22) Filed: Aug. 16, 2001

(65) Prior Publication Data

US 2002/0145240 A1 Oct. 10, 2002

(30) Foreign Application Priority Data

| Apr. 10, 2001 | (JP) | ............................. | 2001-111869 |
| Apr. 10, 2001 | (JP) | ............................. | 2001-111870 |
| Apr. 10, 2001 | (JP) | ............................. | 2001-111871 |

(51) Int. Cl.$^7$ ................................................ F16F 13/00
(52) U.S. Cl. .................................. 267/140.13; 267/219
(58) Field of Search ....................... 267/140.11, 140.13, 267/140.14, 140.15, 219

(56) References Cited

U.S. PATENT DOCUMENTS

| 4,342,446 A | * | 8/1982 | Eaton et al. .................. 267/35 |
| 4,730,584 A | * | 3/1988 | Jordens et al. ......... 267/140.14 |
| 4,781,362 A | * | 11/1988 | Reuter et al. ................ 267/219 |
| 4,842,258 A | * | 6/1989 | Misaka et al. ......... 267/140.13 |
| 4,927,122 A | * | 5/1990 | Brumme et al. ....... 267/140.13 |
| 4,971,456 A | * | 11/1990 | Hori ............................. 384/99 |
| 5,188,346 A | * | 2/1993 | Hamada et al. ........ 267/140.12 |
| 5,927,698 A | * | 7/1999 | Miyoshi et al. ......... 267/140.13 |
| 6,390,459 B2 | * | 5/2002 | Saitoh .................... 267/140.13 |
| 6,443,438 B2 | * | 9/2002 | Satori et al. ........... 267/140.13 |

FOREIGN PATENT DOCUMENTS

JP 3-144134 * 6/1991 ............ F16F/13/00

* cited by examiner

Primary Examiner—Benjamin A. Pezzlo
(74) Attorney, Agent, or Firm—Birch, Stewart, Kolasch & Birch, LLP

(57) ABSTRACT

A fluid-sealed anti-vibration device is provided, in which a cone-shaped mounting section provided with an elastic body section which generates membrane resonance, and a cylindrical bushing section provided with an end wall and an elastic partition wall which also generate membrane resonance are integrally provided. When the fluid is filled and sealed in the cone-shaped mounting section and the cylindrical bushing section, the characteristics where a fluid is sealed in only the cone-shaped mounting section and the characteristics where the fluid is sealed in only the cylindrical busing section are coupled. Furthermore, the dynamic spring peaks and the dynamic spring bottoms, which are generated one by one in both sections, cancel each other. As a result, it is possible to realize the low dynamic spring effect in a wider frequency range by lowering the dynamic spring peak.

17 Claims, 30 Drawing Sheets

FLUID-SEALED ANTI-VIBRATION DEVICE

BACKGROUND OF THE INVENTION

1. Field of the Invention

The present invention relates to a fluid-sealed anti-vibration device which is used in an engine mounting and the like in which a cylindrical bushing and a cone-shaped mounting are integrally provided and dynamic characteristics are improved in a cylindrical bushing.

2. Description of the Prior Art

A cone-shaped mounting is known in the prior art, in which a first connecting member secured to a vibration generating side, a second connecting member secured to a vibration receiving side, and a substantially cone-shaped elastic body section for connecting the first and second connecting members are provided. A fluid chamber is provided inside the elastic body section which forms a part of the elastic wall of the fluid chamber. The fluid chamber is divided into a main fluid chamber and a sub-fluid chamber by a partition member and a first orifice is provided for communicating with both fluid chambers. A cylindrical bushing is also known in the prior art in which inner and outer tubes of a cylindrical shape are connected by an elastic member and a plurality of fluid chambers divided by the elastic member in the circumferential direction is provided. An orifice is arranged to communicate with these fluid chambers.

The present applicant has also filed another patent application (U.S. patent application Ser. No. 09/749,829) concerning a fluid-sealed anti-vibration device similar to the device shown in FIG. 1 and FIG. 2 of the present application. In this application, a cone-shaped mounting section is integrally provided by using an elastic wall which forms a part of a fluid chamber of a cylindrical bushing section and an elastic body section in common. By this integration, the vibrations in the biaxial directions which meet at right angles can be absorbed by the cylindrical bushing section and the vibrations in the direction perpendicular to these can be absorbed by the cone-shaped mounting section. Accordingly, all the vibrations in the triaxial directions which meet at right angles can be absorbed by a single device. In the following description, the vertical direction (the front and rear direction when a car body is installed) and the lateral direction (the lateral direction when the car body is installed) in a condition shown by FIG. 1, and the vertical direction in FIG. 2 (the vertical direction when the car body is installed) are referred to as the X-axis direction, the Y-axis direction, and the Z-axis direction, respectively.

As described above, when the cylindrical bushing section and the con-shaped mounting section are integrally provided, each is provided with a membrane resonance section. Accordingly, as an overall fluid-sealed anti-vibration device, the dynamic spring characteristics in the medium to high frequency range have been determined by coupling each membrane resonance in the cylindrical bushing section and the cone-shaped mounting section. As a result, it is difficult to realize a low dynamic spring effect in a wider range and to form the minimum value of the dynamic spring constant in a specified frequency. It is therefore desirable to make this possible. (Hereinafter the minimum value of the dynamic spring constant is referred to as "a dynamic spring bottom". Likewise, the maximum value of the dynamic spring constant is referred to as "a dynamic spring peak".)

It is therefore a first object of the present invention to realize such a demand and it is a second object to improve dynamic characteristics such as lowering a dynamic spring constant in an optional frequency. The medium to high frequency bands here mean those between about 200 and 1,000 Hz.

In the cylindrical bushing section 2, the elastic member used therein acts as a rubber spring has spring values, each being peculiar to the front and rear direction and the lateral direction. However, when the recessed sections, which is a space opened to the atmosphere, are provided between the neighboring fluid chambers in a circumferential direction, the spring value is reduced in the direction in which the recessed sections are provided. Accordingly, to improve a comfortable car riding, it is necessary to increase the spring values in this direction. For the increase of spring values, it is also considered that the elastic partition wall, which is a partition wall between the recessed section and the fluid chambers, is thickened to raise the rigidity. However, in a case where the recessed sections are disposed in the lateral direction and the liquid chambers are disposed in the front and rear direction, since the elastic partition wall is elastically deformed relative to the input of vibrations in the front and rear direction, it is required to make the capacity of the side fluid chambers variable. Accordingly, it is not possible to raise the rigidity without limitation. It is therefore required to have such a membrane construction as to raise the rigidity relative to only the vibrations in the lateral direction.

It is therefore a third object of the present invention to realize such a demand.

SUMMARY OF THE INVENTION

To attain the above-mentioned first object, according to a first invention of the present invention, a fluid-sealed anti-vibration device is provided, which comprises a cone-shaped mounting section and a cylindrical bushing section, the cone-shaped mounting section being provided with a first connecting member secured to either of a vibration generating side or a vibration receiving side, a second connecting member secured to the other side, a substantially cone-shaped elastic body section for connecting the first and second connecting members, a fluid chamber of which part of an elastic wall is the elastic body section and of which the inside is divided into a main fluid chamber and a sub-fluid chamber by a partition member, and a first orifice for communicating with the main fluid chamber and the sub-fluid chamber, the cylindrical bushing section being provided with a plurality of side fluid chambers which are provided in the circumferential direction at predetermined intervals on the outer circumstance of the elastic body section and of which part of an elastic wall is the elastic body section, and a second orifice for communicating with each side fluid chamber, characterized in that the cone-shaped mounting section and the cylindrical bushing section are caused to generate a membrane resonance in each different natural frequency, and the maximum value or the minimum value of a dynamic spring constant generated by the natural membrane resonance in the cone-shaped mounting section and the maximum value or the minimum value of the dynamic spring constant generated by the natural membrane resonance in the cylindrical bushing section are coupled to interfere with each other, thereby providing low dynamic spring characteristics.

Each natural membrane resonance in the cone-shaped mounting section and the cylindrical bushing section is a membrane resonance with the natural resonant frequency and the dynamic spring characteristics which can be obtained by filling and sealing a fluid in a fluid chamber on either side of the cone-shaped mounting section or the cylindrical bushing section, and by measuring the dynamic spring characteristics.

At this time, the fluid-sealed anti-vibration device may be provided, wherein the cylindrical bushing section forms the maximum value of the dynamic spring constant in the natural frequency by a plurality of membrane resonances and also forms the minimum value of the dynamic spring constant on a higher frequency side than the natural frequency, while the cone-shaped mounting section generates a membrane resonance which forms the minimum value of the dynamic spring constant near and on a frequency side lower than the natural frequency which gives the maximum value.

Also, the fluid-sealed anti-vibration device may be provided, wherein the cylindrical bushing section forms the maximum value of the dynamic spring constant by the natural membrane resonance, and the cone-shaped mounting section also forms the minimum value of the dynamic spring constant by the natural membrane resonance, wherein there is the natural frequency where the minimum value on the mounting section side is formed near and on a frequency side higher than the natural frequency where the maximum value on the bushing section side is formed.

Further, an elastic membrane for absorbing the fluctuations in the internal pressure in the main fluid chamber may be provided, facing the main fluid chamber of the cone-shaped mounting section.

Furthermore, a disc member adapted to move together with the first connecting member may be provided within the main fluid chamber of the cone-shaped mounting section.

In order to attain the above-mentioned second object, a second invention of a fluid-sealed anti-vibration device of this patent application comprises a first mounting member that is mounted on either a vibration generating side or a vibration receiving side, a second mounting member that is mounted on the other side and encloses the first mounting member in a nearly cylindrical state, an elastic partition wall provided for connecting these first and second mounting members and dividing the inside of the device into plural chambers, and a cylindrical bushing communicating with these fluid chambers through orifice passages, wherein three pairs of the fluid chambers are provided and three kinds of orifice passages are provided for communicating with each pair of fluid chambers through an orifice passage.

At this time, one of said three kinds of orifice passages can be made as a damping orifice passage and the liquid column resonance frequency of the other two orifices is set near the liquid column resonance frequency of the damping orifice passage.

Also, one of said three kinds orifice passages can be made as a damping orifice passage, another orifice passage as an idle orifice passage and the remaining orifice passage is set at a liquid column resonance frequency where the anti-resonance frequency of the idle orifice passage becomes maximum.

Further, the liquid column resonance frequency of one of three kinds of orifice passages having the largest rate of fluid flow out of said three kinds of orifice passages can be set lower than the liquid column resonance frequency of other orifice passages.

Furthermore, the liquid column resonance frequency of one of said three kinds of orifice passages having the largest rate of fluid flow out of three kinds of orifice passages can be set higher than the liquid column resonance frequencies of the other orifice passages.

To attain the above-mentioned third object, according to a third invention of the present invention, a fluid-sealed anti-vibration device having a cylindrical bushing section is provided, in which the cylindrical bushing section comprises a first connecting member secured to either of a vibration generating side or a vibration receiving side, a second connecting member secured to the other side and enclosing the periphery of the first connecting member in a substantially cylindrical shape, and an elastic partition wall for connecting the first and second connecting members, wherein the inside of the cylindrical bushing section is divided by the elastic partition wall into a plurality of fluid chambers, and an orifice is provided to communicate with each fluid chamber, characterized in that by press-fitting the elastic partition wall to the first or second connecting member side, the elastic partition wall is compressed by the first or second connecting member to adjust a spring ratio in the direction for connecting the first and second connecting members and in the direction substantially perpendicular to that direction.

To obtain the above-mentioned third object according to a forth invention of the present application, a fluid-sealed anti-vibration device having a cone-shaped mounting section and a cylindrical bushing section is provided, in which the cone-shaped mounting section is provided with a first connecting member secured to either of a vibration generating side or a vibration receiving side, a second connecting member secured to the other side, and a substantially cone-shaped elastic body member for connecting the first and second connecting members, wherein a fluid chamber is provided of which part of an elastic wall is the elastic body member and of which the inside is divided by a partition member into a main fluid chamber and a sub-fluid chamber, and a first orifice is provided to communicate with the main fluid chamber and the sub-fluid chamber, and the cylindrical bushing section is provided with a plurality of side fluid chambers on the outer periphery of the elastic body member which is used in common with a part of the elastic wall of the fluid chambers, in the circumferential direction at a predetermined interval, wherein a second orifice is provided to communicate with each side fluid chamber, characterized in that the cylindrical bushing section and the cone-shaped mounting section are integrally provided, and the side fluid chambers are divided by an elastic partition wall which connects the first and second connecting members, wherein by press-fitting the elastic partition wall to the first or second connecting member side, the elastic partition wall is compressed by the first or second connecting member to adjust a spring ratio in the direction for connecting the first and second connecting members and in the direction substantially perpendicular to that direction.

In the above-mentioned third and fourth invention, the fluid-sealed anti-vibration device according to the first or second invention can be provided, wherein a seat section to which the elastic partition wall is press-fitted is provided with a projecting section which engages a press-fitting end of the elastic partition wall, and there is provided a predetermined space between the projecting section and the elastic partition wall.

According to the first invention, the maximum value or the minimum value of the dynamic spring constant generated by the nature membrane resonance in the cone-shaped mounting section and the maximum value or the minimum value of the dynamic spring constant generated by the natural membrane resonance in the cylindrical bushing section are coupled to interfere with each other. Accordingly, the dynamic spring peak generated by the natural membrane resonance in the cylindrical bushing section or the cone-shaped mounting section is lowered by the dynamic spring bottom generated by the natural membrane resonance on the other side. As a result, a low dynamic spring effect can be realized in a wider frequency range, from the medium to high frequency.

At this time, when the cylindrical bushing section is provided with a plurality of membrane resonant sections, wherein each forms the dynamic spring peak in the specified frequency and the dynamic spring bottom on the frequency side higher than the specified frequency. Accordingly, when the membrane resonance in the cone-shaped mounting section forms the dynamic spring bottom on the frequency side lower than the specified frequency in the dynamic spring peak, the dynamic spring peak on the cylindrical bushing section side is lowered. In this case, since the dynamic spring peak is generated on the frequency side lower than the dynamic spring bottom in the cylindrical bushing section, the low dynamic spring is realized in a wider range of frequencies.

Also, when the dynamic spring peak by the natural membrane resonance in the cylindrical bushing section is generated on the frequency side lower than the dynamic spring bottom by the natural membrane resonance in the cone-shaped mounting section, the dynamic spring peak in the cylindrical bushing section is lowered by the dynamic spring bottom by the membrane resonance in the cone-shaped mounting section to realize the low dynamic spring effect.

The membrane resonance in the cylindrical bushing section having the dynamic spring peak is generated on the lower frequency side sooner than the membrane resonance on the side of the cone-shaped mounting section having the dynamic spring bottom, and the membrane resonance in the cone-shaped mounting section is strengthened by the membrane resonant energy on the cylindrical bushing section side. As a result, the dynamic spring bottom on the cone-shaped mounting section side is amplified to allow the coupled dynamic spring characteristics to cause the dynamic spring bottom. Accordingly, it is possible to form the dynamic spring bottom in the specified frequency.

Further, when an elastic membrane for absorbing the fluctuations in the internal pressure in the main fluid chamber is provided, facing the main fluid chamber of the cone-shaped mounting section, it is possible to realize a further low dynamic spring effect over the entire spring characteristics.

Furthermore, in a case that the disc member which moves together with the first connecting member is provided within the main fluid chamber of the cone-shaped mounting section, when the disc member vibrates together with the first connecting member within the main fluid chamber, liquid column resonance is generated. When the liquid column resonance is coupled to the membrane resonance of the elastic body section, it is possible to realize a further low dynamic spring in the medium to high frequency range.

According to the second invention, as three pairs of fluid chambers and three kinds of orifice passages communicating with these passages are provided, when one of three kinds of orifice passages is provided as a damping orifice passage, another passage as an idle orifice passage and the remaining passage as an orifice passage for liquid column resonance on a high frequency side, the anti-resonance effect of the liquid column resonance of the damping orifice passage is reduced and a low dynamic spring can be realized in a wide range of frequencies.

At this time, when one of three kinds of orifice passages is provided as a damping orifice passage and the liquid column frequency of the other two passages is set near the liquid column resonance frequency of the damping orifice passage, the damping by the damping orifice can be extended to a wider range of frequencies by the liquid column resonance of the other two orifice passages and it becomes possible to realize the broad damping.

Also, when one of three kinds of orifice passages is made as a damping orifice passage, another passage is provided as an idle orifice passage, and the liquid column resonance frequency of the remaining orifice passage is set at a frequency where the anti-resonance of the idle orifice passage becomes the maximum, the anti-resonance in the idle orifice passage can be absorbed by the remaining orifice passages and it becomes possible to realize a low dynamic spring on a higher frequency side than the idle frequency.

Further, when the liquid column resonance frequency of one of three kinds of orifice passages, of which the fluid flow rate is highest is reduced to less than the liquid column resonance frequency of other orifice passages, this orifice passage becomes a damping orifice passage and the influence of anti-resonance can be made less.

Furthermore, when liquid column resonance frequency of one of three kinds of orifice passages of which the fluid flow rate is highest is made higher than the liquid column resonance frequency of the other orifice passages, the liquid column resonance is generated in the remaining orifice passage on the lower frequency side and thus, it becomes possible to realize a low dynamic spring.

According to the third invention, since the fluid-sealed anti-vibration device is provided, in which the elastic partition wall of the cylindrical bushing section is press-fitted on the first or second connecting member side, the elastic partition member is compressed by the first or second connecting member to raise the spring value in the direction for connecting the first and second connecting members (hereinafter referred to as "the Y-axis direction"). As a result, when the spring in the Y-axis direction in which the spring value tends to lower is strengthened, and the direction perpendicular to the Y-axis direction is the X-axis, it is possible to easily control the spring ratio in the two axial directions perpendicular to each other.

According to the fourth invention, since the cylindrical bushing section is integrally formed with the cone-shaped mounting section, when the input direction of major vibrations in the cone-shaped mounting section is the Z-axis perpendicular to the X and Y-axes, it is possible to easily control the spring ratio in the three axial directions perpendicular to each other.

Also, in the third and fourth invention, when there is provided a space between the press-fitting section of the elastic partition wall and the projecting section provided on the seat section, when the elastic partition wall is elastically deformed, the spring value is set to increase the amount of elastic deformation for smaller vibrations. On the other hand, when the vibrations are large enough to allow the elastic partition wall to contact the projecting section, further elastic deformation is controlled to increase the spring value, wherein the spring value can be changed non-linearly.

DETAILED DESCRIPTION OF THE PREFERRED EMBODIMENTS

Figure 1:
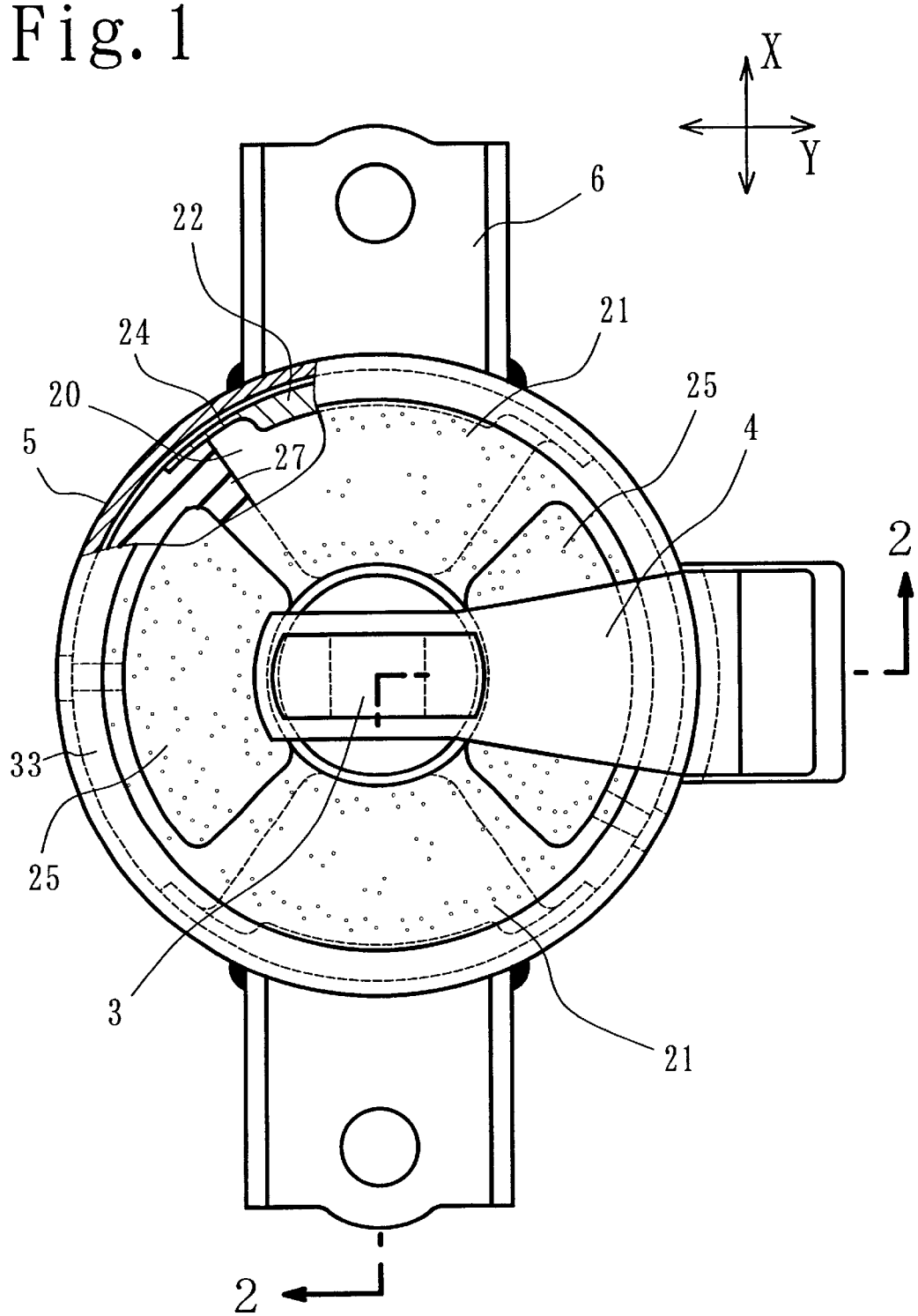
FIG. 1 is a plan view of an engine mount according to a first embodiment of the present invention.
Figure 2:
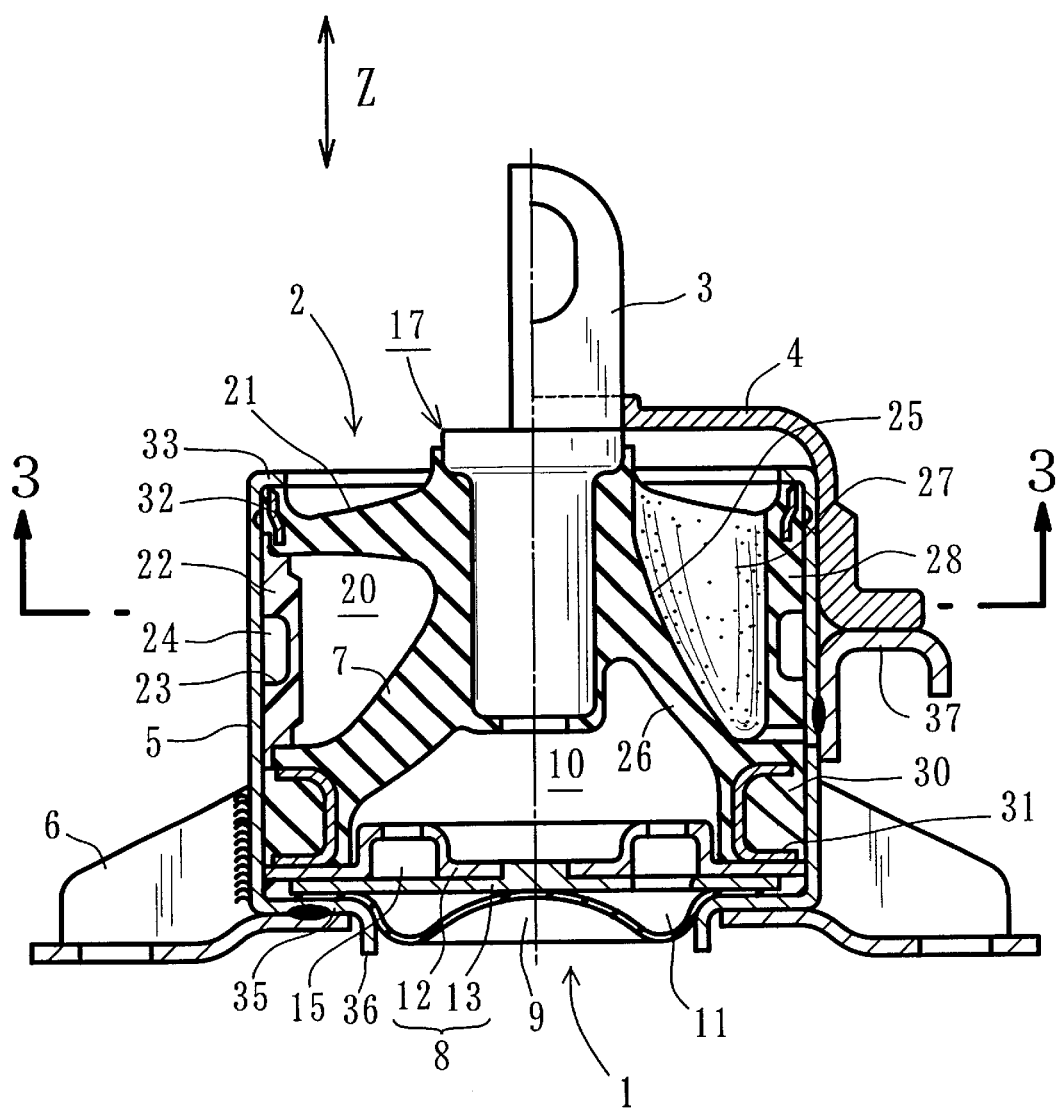
FIG. 2 is a cross-sectional view taken along line 2—2 of FIG. 1.
Figure 3:
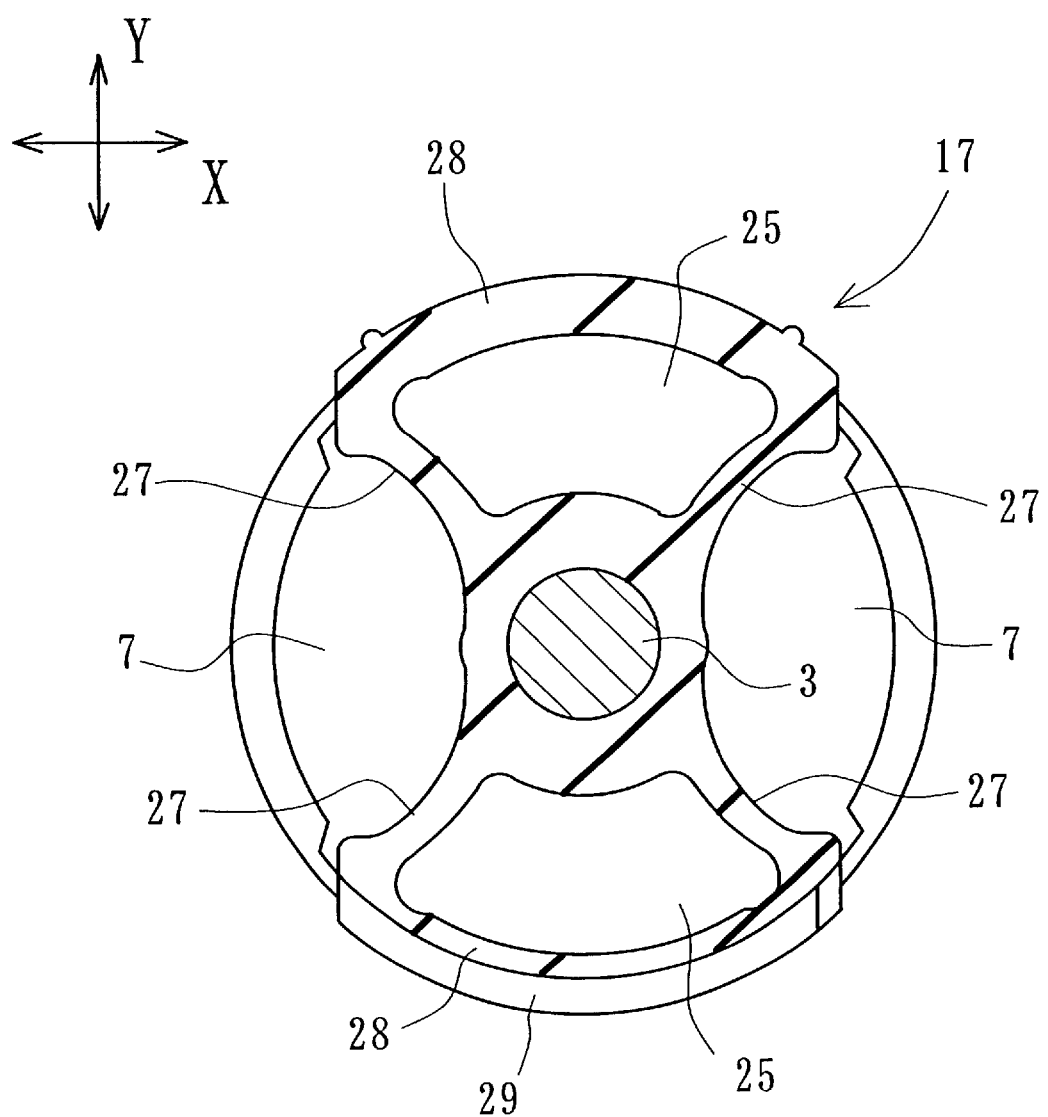
FIG. 3 is a cross-sectional view taken along line 3—3 of FIG. 2.
Figure 4:
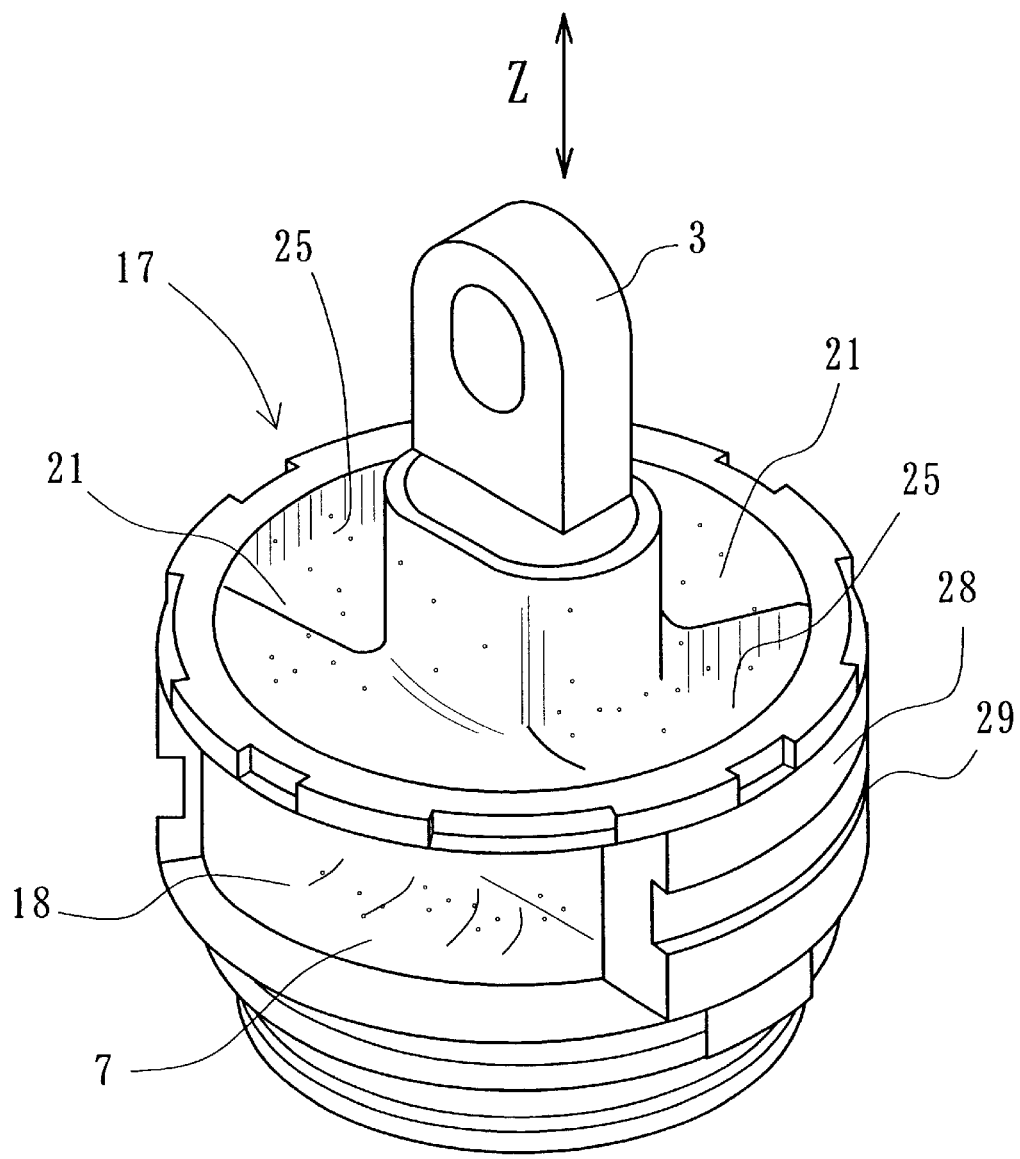
FIG. 4 is a perspective view of an insert body.

A first embodiment that is constructed as an engine mounting for a vehicle will be described with reference to the accompanying drawings. FIG. 1 is a plan view showing the engine mounting from the top when a car body is installed in the Z-axis direction. FIG. 2 is cross-sectional view of the engine mounting at a 90° difference (i.e. the cross-sectional view taken along line 2—2 of FIG. 1), and FIG. 3 is a cross-sectional view of an insert body taken along line 3—3 of FIG. 2. FIG. 4 is a perspective view of the insert body in which a first connecting member and an elastic member are integrally provided. In the following description, the vertical direction in FIG. 1 (i.e. the front and rear direction when the car body is installed) is referred to as the X-axis direction, and the lateral direction in FIG. 1 (i.e. the lateral direction in the car body installation) is referred to as the Y-axis direction. The vertical direction in FIG. 2 (i.e. the vertical direction when the car body is installed) is referred to as the Z-axis direction.

In these figures, a cone-shaped mounting section 1 is integrally formed with a cylindrical bushing section 2 to provide the engine mounting. The cone-shaped mounting section 1 is provided with a first connecting member 3 secured to an engine side, a second connecting member 5 constructed as a cylinder-shaped rigid outer frame which surrounds the periphery of the first connecting member 3 at intervals, and a substantially cone-shaped elastic body section 7 for connecting the first connecting member 3 with the second connecting member 5. One end of a stopper 4 with a substantially L-shaped cross-section is secured to the first connecting member 3. Welded to the second connecting member 5 is a car body side bracket 6 which is secured to a car body side.

The axial center direction of the first connecting member 3 agrees with the Z-axis direction which is the input direction of the main vibrations in the cone-shaped mounting section 1. A part of the first connecting member 3 which is embedded within the elastic body section 7 is columnar, has a diameter in the lower section narrower than a step provided in the upper section, and extends well along the Z-axis direction. A part of the first connecting member 3 projecting from the elastic body section 7 is flat and is connected to the stopper 4.

A substantially cone-shaped space formed by the elastic body section 7 is a fluid chamber which opens downwards as shown in FIGS. 2 and 3, and a partition member 8 and a diaphragm 9 are secured to this open section. Provided between the inner wall of the elastic body section 7 and the partition member 8 is a main fluid chamber 10 of which part of the elastic wall is the elastic body section 7. A sub-fluid chamber 11 is formed between the partition member 8 and the diaphragm 9. In this manner, the partition member 8 divides the fluid chamber into the main fluid chamber 10 and the sub-fluid chamber 11.

The partition member 8 is composed of a cylindrical section 12 made of a suitable resin and a pressure plate 13, of a smaller diameter than the cylindrical section 12, overlapping on the surface of the cylindrical section 12 on the sub-fluid chamber 11 side. A first orifice 15 is formed between the cylindrical section 12 and the pressure plate 13. The first orifice 15 always communicates with the main fluid chamber 10 and the sub-fluid chamber 11 to serve as a damping orifice for absorbing the vibrations in the small amplitude and low frequency domain during general operation of the vehicle.

The elastic body section 7, and an end wall and an elastic partition wall (described later) which form the cone-shaped mounting section 1 and the cylindrical busing section 2 are integrally formed by the same single elastic member. A single insert body 17 (see FIG. 4) is integrally formed using these elastic materials and the first connecting member 3. The insert body 17 is provided with a pocket section 18 opening to the side. The pocket section 18 forms a fluid chamber space of the cylindrical bushing section 2 described later.

The cylindrical bushing section 2 is provided with a plurality of side fluid chambers 20 on the outer circumference of the elastic body section 7. A part of the elastic wall of each chamber 20 is the outer wall of the elastic body section 7. The side fluid chambers 20 are formed as a space with a substantially triangular cross-section as shown in the figure, opening laterally. The side fluid chambers are sealed by the end wall 21, which is integrally formed with the elastic body section 7 to extend in a substantially horizontal direction, and by a fluid chamber cover 22 made of resin and adapted to engage the laterally opening section.

The fluid chamber cover 22 is closely fitted, in an arc shape, on the inner circumference of the second connecting member 5 in about ¼ of the circumferential distance. The surface of fluid chamber cover 22 contacting the second connecting member 5 (hereinafter referred to as "an outer surface") is provided with a groove 23 extending in the circumferential direction which opens to the second connecting member 5 side. A second orifice 24 is provided between the fluid chamber cover 22 and the second connecting member 5. The second orifice 24 is formed in the circumferential direction along the inner surface of the second connecting member 5 to always communicate with a pair of side fluid chambers 20, 20 and serves as a damping orifice in the same manner as the first orifice 15.

Further, the cylindrical bushing section 2 is provided with a recessed chamber 25 adjacent to the side fluid chamber 20. As shown in FIG. 1, the cylindrical bushing section 2 is provided, on the outer circumference of the elastic body section 7, with two side fluid chambers 20 and two recessed sections 25 adjacently at intervals of 90° in the circumferential direction. The paired side fluid chambers 20, 20 and recessed sections 25, 25 are oppositely situated at intervals of 180° relative to the central section. The paired side fluid chambers 20, 20 are arranged on the X-axis which is the input direction of the main vibrations in the cylindrical bushing section 2.

The recessed sections 25 open upwards in FIG. 2 and are enclosed by an elastic section consisting of a thin section 26, an elastic partition wall 27, and a side-wall 28. The thin section 26 forms a bottom section of the recessed section 25 acting as a partition between the main fluid chamber 10 and the recessed section 25. The thin section 26 is formed by particularly thinning a part of the elastic body section 7 to generate the membrane resonance by the input of vibrations of which the membrane characteristics are in the medium frequency domain.

The elastic partition walls 27 partition the side fluid chambers 20 and as is obvious in FIG. 3, each is formed in the radial direction and is also formed as a thin elastic wall having the same membrane resonant characteristics as the thin section 26. The side-wall 28 is closely fitted to the inner surface of the second connecting member 5 and is formed integrally with the thin section 26 and the elastic partition wall 27. The outer surface of the side-wall 28 is provided with a groove 29 (see FIG. 4), similar to the groove 23, to form a part of the second orifice 24.

As shown in FIG. 2, an end of the elastic body section 7 and one end of the side-wall 28 form an enlarged section 30 in which a ring 31 of a C-shaped cross-section is integrally embedded. Only the lower surface of the ring 31 is exposed to contact the upper surface of the partition member 8 for positioning. The enlarged section 30 closely contacts the inner surface of the second connecting member 5 and the lower end section of the fluid chamber cover 22 for sealing.

A ring 32 of a S-shaped cross-section is also integrally embedded in the end wall 21 and the upper end side of the side-wall 28 and is fixedly secured by a clamping section 33 which is formed by bending the upper end of the second connecting member 5 inward. The end wall 21, the thin section 26, the elastic partition wall 27, the side-wall 28, and the enlarged section 30 are all integrally constructed from the same single elastic material as the elastic body section 7.

A section of the second connecting member 5 lower than the partition member 8 is formed with an inwardly folded section 35. The outer peripheral section of the partition member 8 is inserted and secured between the inwardly folded section 35 and the ring 31. A further inward end section 36 of the folded section 35 is folded downward to form a circular wall in which the actuating space of the diaphragm 9 is provided.

A receiving member 37 of a substantially C-shaped cross-section is welded to an intermediate section, in the vertical direction of the figure, of the outside of the second connecting member 5. The receiving section 37 is adapted to contact and receive an end of the stopper 4 which moves downward when an excessive load is input to the first connecting member 3 side.

To assemble this engine mounting, the diaphragm 9 is inserted into the inside of the second connecting member 5, and the outer peripheral section of the diaphragm 9 is mounted on the inwardly folded section 35. The partition member 8 is then inserted into the inside of the second connecting member 5, and the outer peripheral section of the cylindrical section 12 is overlapped on an enlarged section formed at the outer periphery of the diaphragm 9. The outer peripheral section of the diaphragm 9 is then inserted between the outer peripheral section of the partition member 8 and the inwardly folded section 35.

Then, an insert body 17 is inserted into the second connecting member 5. At this time, the side opening section of the side fluid chambers 20 must be blocked in advance by the fluid chamber cover 22. The ring 31 of the elastic molded unit 34 is placed on the outer peripheral section of the partition member 8 which has been placed on the outer periphery of the inwardly folded section 35. An upper end of the second connecting member 5 is inwardly bent to form a caulking section 33 by which the S-shaped ring 32 is fixedly secured. In this case, the outer peripheral section of the partition member 8 is secured and sealed by the outer peripheral section of the diaphragm 9 inserted between the ring 31 and the inwardly folded section 35. In this assembly process, an incompressible fluid is filled into the main fluid chamber 10, the sub-fluid chamber 11, and the side fluid chambers 20 using a known method.

An operation of the present embodiment will now be described. If the arrangement is made to allow the input direction of the main vibrations in the cone-shaped mounting section 1 to be the Z-axis direction and to allow the input direction of the main vibrations in the cylindrical bushing section 2 to be the X-axis direction, the vibrations in the Z-axis direction are remarkably damped by the liquid column resonance of the first orifice 15 in the cone-shaped mounting section 1. On the other hand, the vibrations in the X-axis direction are also remarkably damped because liquid column resonance is generated when the fluid moves through the second orifice 24 between the front and rear side fluid chambers 20, 20 during installation of the car body.

By providing the thin section 26, the membrane resonance is generated in the frequency in a specified medium frequency domain. With this membrane resonance, a low dynamic spring effect is realized in the specified medium frequency domain and as a result, it is possible to absorb the vibrations in each of the X and Z-axes directions in the medium frequency domain. Accordingly, each vibration in the X and Z-axes directions can be reduced based on the fluid flow between the fluid chambers, and the low dynamic spring effect can be realized by the membrane resonance in the medium frequency domain. It is also possible to efficiently reduce the vibrations at the same time by a single device.

Figure 12:
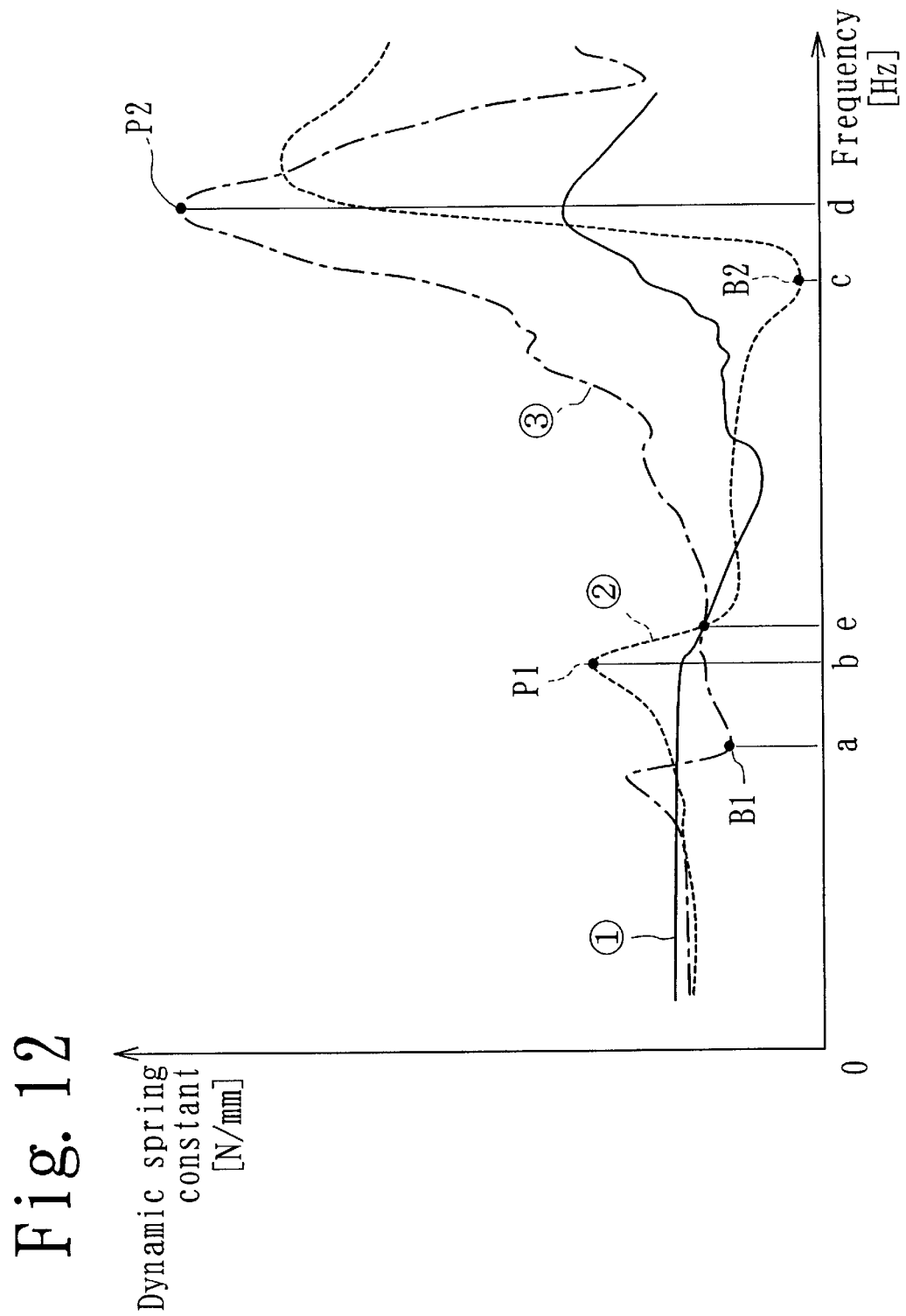
FIG. 12 is a graph showing an action and effect of the first embodiment.

FIG. 12 is a graph showing the dynamic spring characteristics of the present invention, in which the vertical axis shows the dynamic spring constant and the horizontal axis shows the frequency of input vibrations. In addition to a characteristic curve $\hat{1}$ of the present embodiment, a characteristics curve $\hat{3}$ in the case where a fluid is filled and sealed in only the cone-shaped mounting section 1 and a characteristic curve $\hat{2}$ in the case where the fluid is filled and sealed in only the cylindrical bushing section 2 are shown for reference.

First, when the fluid is filled and sealed in only the cone-shaped mounting section 1, as shown in the characteristic curve $\hat{3}$, the dynamic spring bottom B1 is generated by the membrane resonance in the thin section 26 of the elastic body section 7 in the frequency a, and the dynamic spring peak P2 is generated by the membrane resonance of a thick section 7 in the comparatively higher frequency d. When the fluid is filled and sealed in only the cylindrical bushing section 2, as shown in the characteristic curve $\hat{2}$, the dynamic spring peak P1 is generated by the membrane resonance of the end wall 21 in the frequency b, and the dynamic spring bottom B2 is generated by the membrane resonance of the elastic partition wall 27 in the frequency side higher than the frequency b and in the frequency c lower than the frequency d. The frequencies occur in the order of a<b<c<d.

On the other hand, according to the present embodiment, since the fluid is filled and sealed in each fluid chamber of the cone-shaped mounting section 1 and the cylindrical bushing section 2, the characteristic is shown by the characteristic curve $\hat{1}$ obtained by coupling both characteristic curves $\hat{2}$ and $\hat{3}$. In this case, by using a setting which allows the dynamic spring bottom B1 to be generated in a lower frequency than the dynamic spring peak P1, the characteristic curve $\hat{1}$ between the frequency a and the frequency b is a comparatively flat curve obtained by averaging the dynamic spring peak P1 and the dynamic spring bottom B1. This means that the lower the dynamic spring peak P1, the lower the dynamic spring.

Further, by allowing the dynamic spring bottom B2 of the characteristic curve $\hat{2}$ to be generated in the frequency c lower than the frequency d of the dynamic spring peak P2, the dynamic spring peak P2 is also lowered, and the dynamic spring constant is lowered below the characteristic curve $\hat{3}$ in the lower frequency side, below an intersection point e, where the characteristic curve $\hat{2}$ which is declining after passing the dynamic spring peak P1 and the characteristic curve $\hat{3}$, which is ascending after passing the dynamic spring bottom B1, meet, and the dynamic spring constant is lowered below the characteristic curve $\hat{2}$ in the higher frequency side, below the intersection point e.

Accordingly, it is possible to realize the low dynamic spring effect in a wider frequency domain from the frequency b of the dynamic spring peak P1 to the frequency d of the dynamic spring peak P2. Finally, it is possible to fully realize the low dynamic spring effect of the characteristic curve $\hat{1}$ in the normal range below the frequency d where the vibration reduction is required. In the present embodiment, since the low dynamic spring effect has been realized even in a frequency side higher than the frequency d, it is possible to show a greater performance than required.

Figure 5:
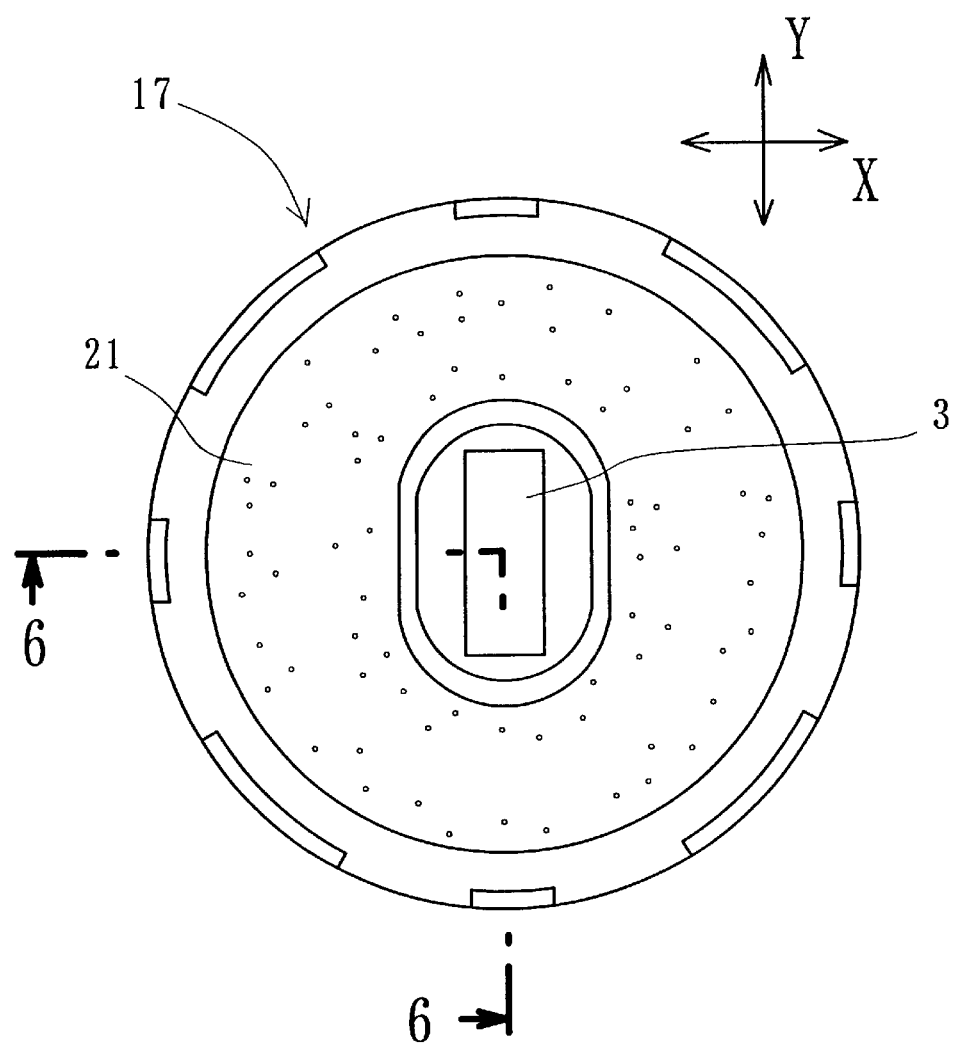
FIG. 5 is a plan view of the insert body according to a second embodiment.
Figure 6:
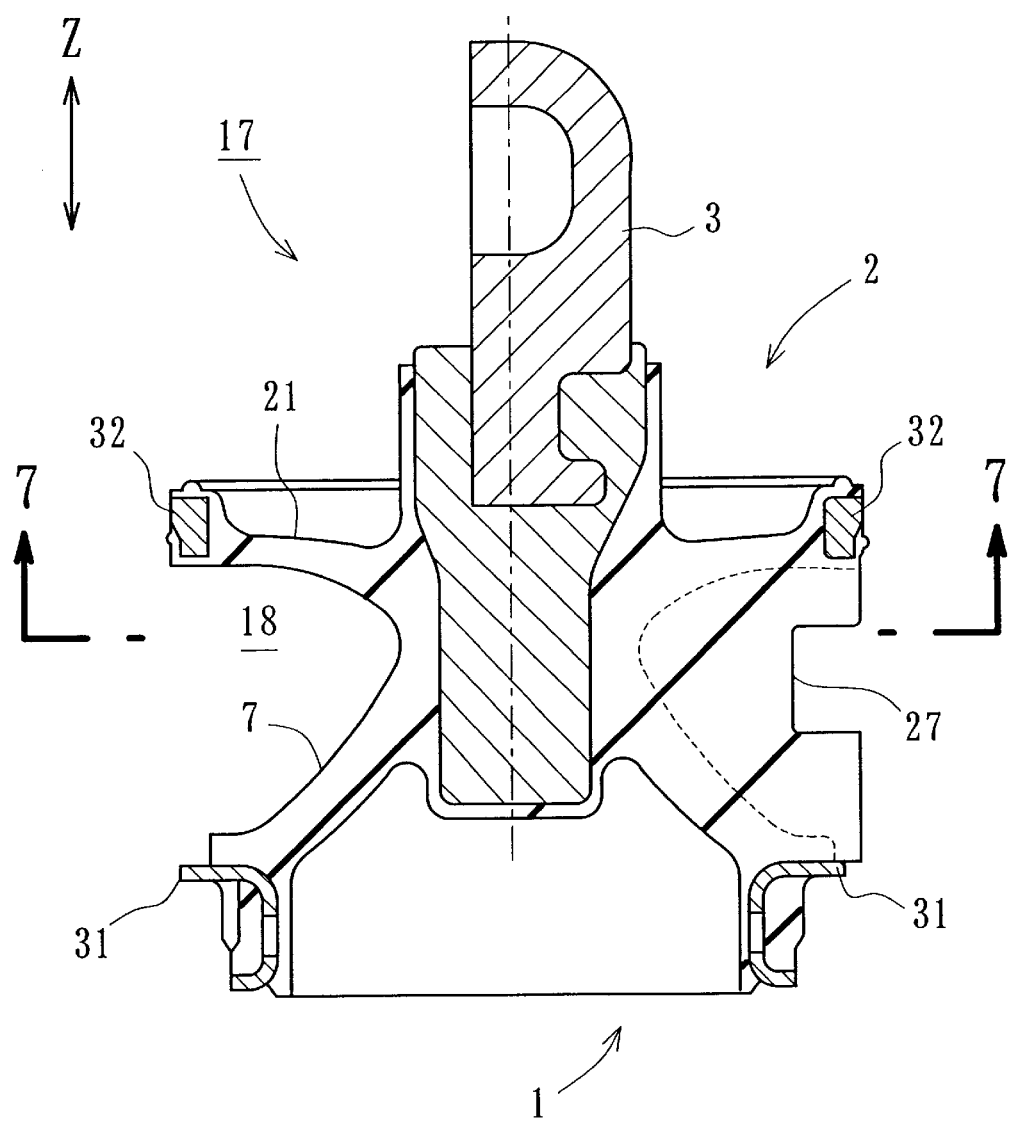
FIG. 6 is a cross-sectional view taken along line 6—6 of FIG. 5.
Figure 7:
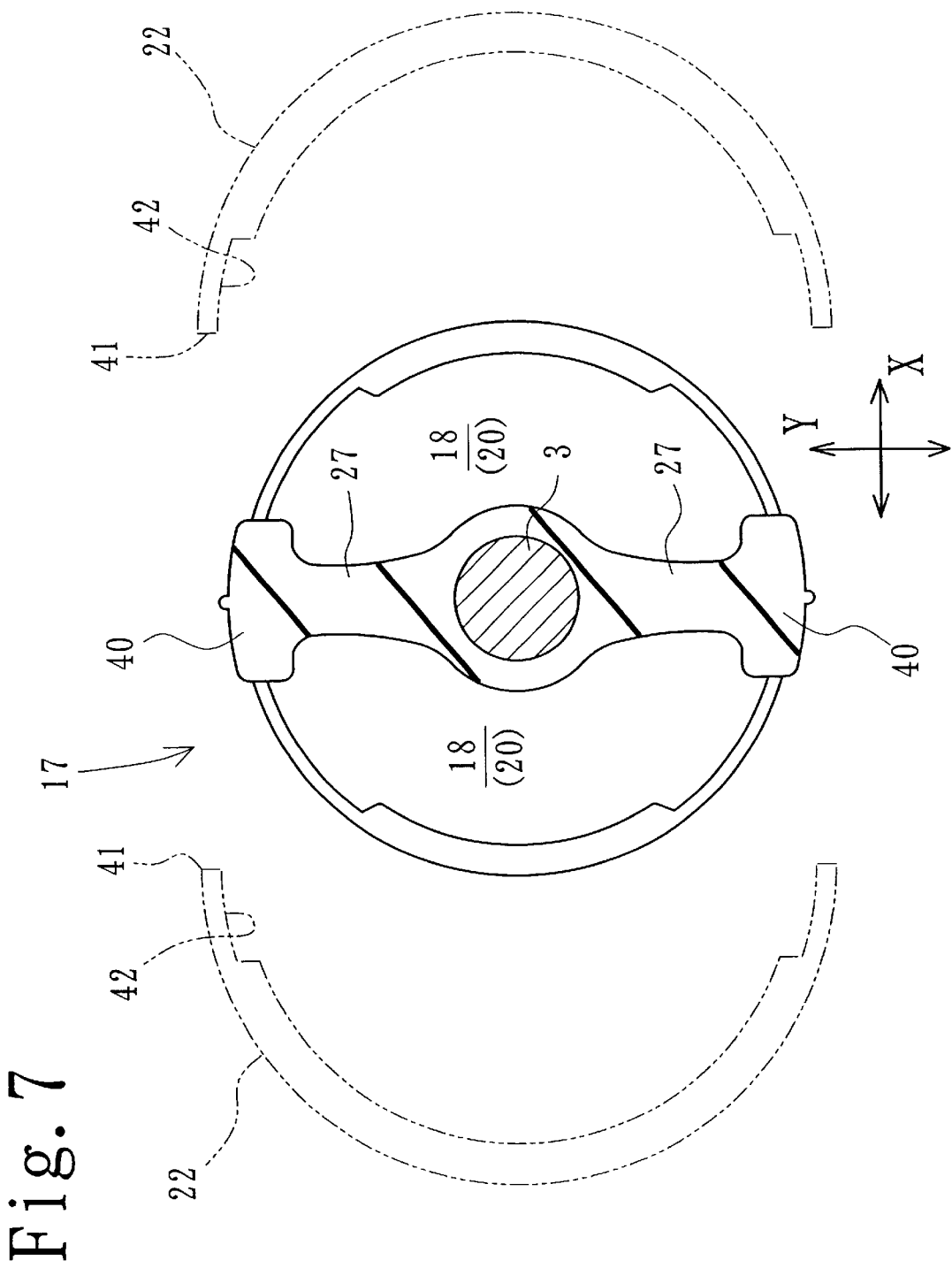
FIG. 7 is a cross-sectional view taken along line 7—7 of FIG. 6.

A second embodiment will now be described. FIG. 5 is a plan view of an insert body according to the present embodiment. FIG. 6 is a cross-sectional view taken along line 6—6 of FIG. 5 and FIG. 7 is a cross-sectional view taken along line 7—7 of FIG. 6. In the present embodiment, the structure of the insert body and the like differs partially from that in the first embodiment, but the remaining portions are common with the previous embodiment. Accordingly, description for the overlapping sections will be omitted. Common reference numerals are used for the parts in common with the first embodiment.

The insert body 17 in the present embodiment is characterized in that only the elastic partition wall 27 is designed to have a solid-core structure without a recessed section. Namely, the elastic partition wall 27 differs from that in the previous embodiment. As shown in FIG. 7, the elastic partition wall 27 extends to the opposite side on the Y-axis at intervals of 180° relative to the central section and vertically partitions a pocket section 18 which is substantially semicircular in the plane cross-section.

An end section 40 of the elastic partition wall 27 slightly projects in the radial direction from the inner diameter of the second connecting member 5. A connecting end section 41 of the fluid chamber cover 22 covering the pocket section 18 overlaps the end section 40 and is inserted into the second connecting member 5 by press-fitting. The elastic partition wall 27 is then pressed inwards to allow the insert body 17 to closely engage the inside of the second connecting member 5. In this manner, the fluid chamber cover 22 is caused to closely contact the inner surface of the second connecting member 5 so as to cover and seal the pocket section 18. A seating section 42 of the fluid chamber cover 22 also closely contacts the end section 40 of the elastic partition wall 27 and as a result, the connecting end section 41 is kept in a fluid-sealed condition by the end section 40.

The fluid chamber cover 22 is caused to closely contact the inner circumference of the second connecting member 5 in an arc-shaped manner with a distance of substantially ½ circumference. The outer surface of the fluid chamber cover 22 is provided with a groove adapted to serve as a second orifice 24 in the same manner as in the previous embodiment. The second orifice 24 communicates with the front and back side fluid chambers 20 formed by covering the front and back pocket sections 18 using the fluid chamber cover 22.

The upper section of the elastic partition wall 27 is integrally formed with the elastic body section 7 and continuously extends to a disc-shaped end section wall 21 which extends in a substantially horizontal direction. The lower section of the elastic partition wall 27 also continuously extends to the elastic body section 7. This elastic partition wall 27 is formed as a thin elastic wall having the same membrane resonant characteristics as the elastic body section 7.

Next, operation of the present embodiment will be described. In the cylindrical bushing section 2 according to the present embodiment, when vibrations are input in the front and back direction (i.e. the X-axis direction), the fluid moves through the second orifice between the front and back, side fluid chambers 20. As a result, the vibrations can be damped using the liquid column in the same manner as in the previous embodiment.

The vibrations in the lateral direction can also be absorbed by the spring elasticity of the elastic partition wall 27. In this case, the elastic partition wall 27 is formed in a solid-core shape without a recessed section and the end section wall 21 is formed in a single disc-shape. When assembled, the elastic partition wall 27 is pressed in the central direction and as a result, the spring value in the lateral direction can be increased.

Figure 13:
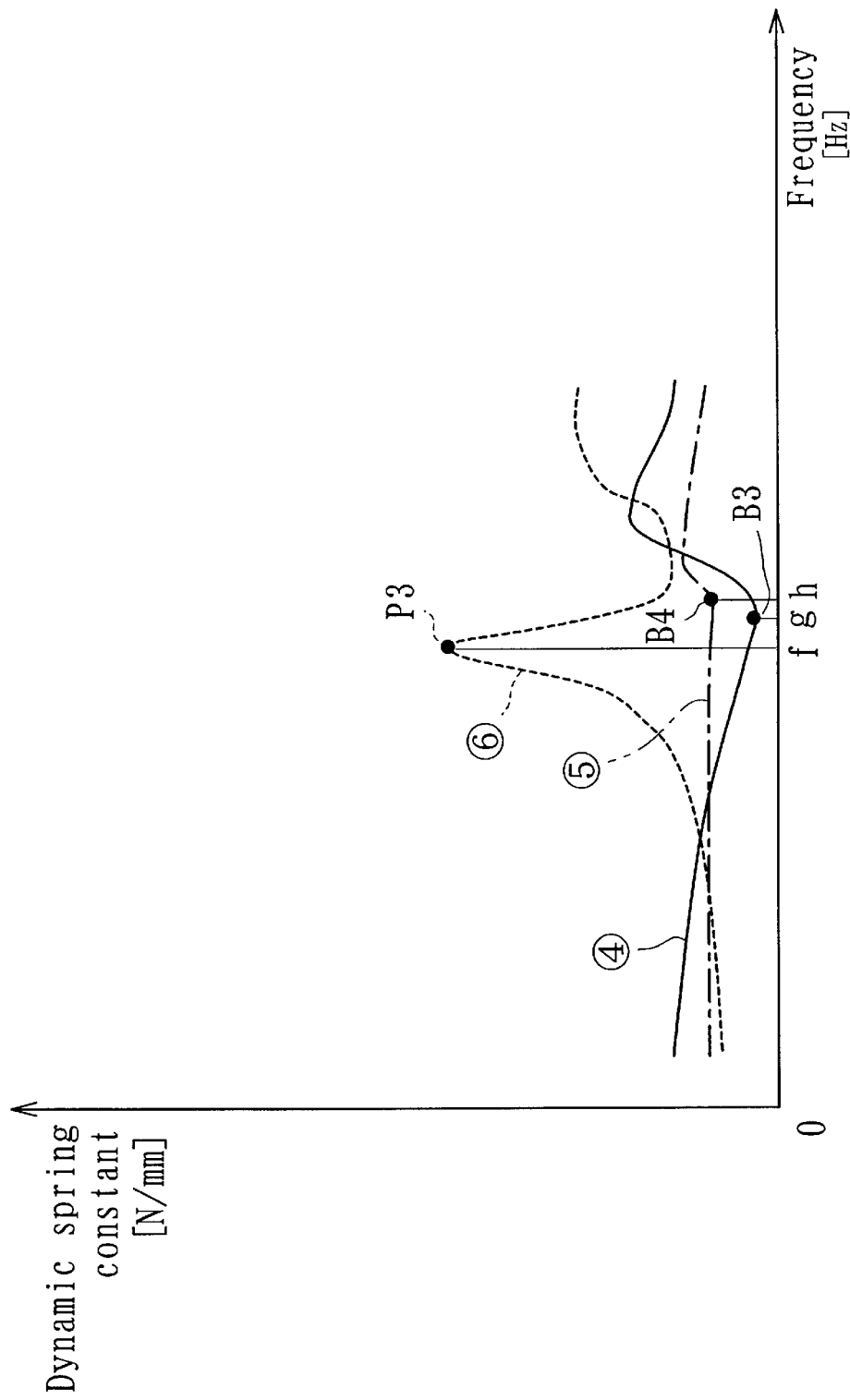
FIG. 13 is a graph showing an action and effect of the second embodiment.

In the same manner as in the previous embodiment, the vibrations can be absorbed efficiently using each membrane resonance by the elastic body section 7, the end section wall 21 and the elastic partition wall 27. FIG. 13 is a graph, corresponding to FIG. 12, showing the dynamic spring characteristics of the present embodiment. In addition to the characteristic curve 4 of the present embodiment, the characteristic curve 5 in the case where the fluid is filled and sealed in only the cone-shaped mounting section 1, and the characteristic curve 6 in the case where the fluid is filled and sealed in only the cylindrical bushing section 2 are shown for reference.

First, when the fluid is filled and sealed in only the cylindrical bushing section 2, as shown in the characteristic curve 6, the dynamic spring peak P3 is generated by the membrane resonance of the end section wall 21 in the frequency f and the dynamic spring bottom of anti-resonance is generated on the frequency side higher than P3 and in a frequency higher than the frequency f. The elastic partition wall 27 does not generate membrane resonance because the front and rear sections thereof are situated in the fluid.

When the fluid is filled and sealed in only the cone-shaped mounting section 1, as shown in the characteristic curve 5, the dynamic spring bottom B4 is generated by the membrane resonance in the elastic body section 7 in the frequency h higher than the frequency f. This frequency h is situated on the slightly lower frequency domain side than the frequency where the dynamic spring bottom is generated by the anti-resonance of the characteristic curve 6. Thereafter, the higher the frequency by the anti-resonance, the higher the dynamic spring constant.

The characteristic curve of the present embodiment is shown by 4 which couples the characteristic curves 5 and 6. In this case, by setting the frequency of the dynamic spring bottom B4 on the frequency side h higher than the frequency f of the dynamic spring peak P3, the dynamic spring peak P3 is lowered and the low dynamic spring effect can be realized.

The dynamic spring bottom B3 is generated in the frequency g between the frequency f and the frequency h. The relationship of each frequency is f<g<h. The dynamic spring bottom B4 is amplified by the membrane resonance on the cylindrical bushing section side and as a result, the dynamic spring bottom B3 is generated. Namely, the membrane resonance on the cylindrical bushing section side, which generates the dynamic spring peak P3 on the lower frequency side, imparts its energy to the membrane resonance on the cone-shaped mounting section side which will be generated on the higher frequency side. Accordingly, the dynamic spring bottom B4 is amplified to generate the dynamic spring bottom B3 as the coupled dynamic spring characteristics.

Accordingly, according to this embodiment, in the entire dynamic spring characteristics, it is possible to form the dynamic spring bottom in a specified frequency to realize a wide variety of tuning.

Figure 8:
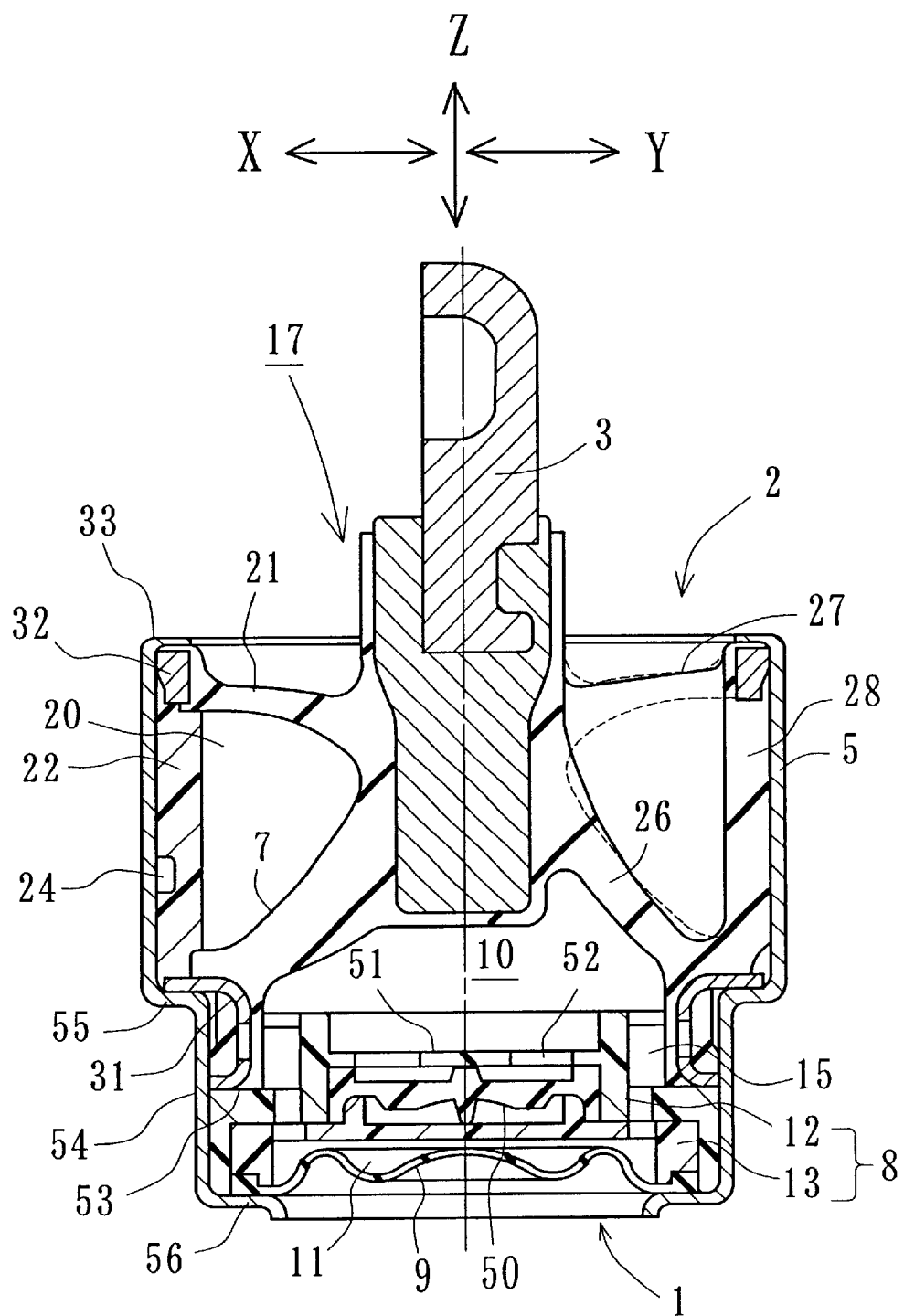
FIG. 8 is a cross-sectional view, corresponding to FIG. 2, according to a third embodiment.

FIG. 8 is a cross-sectional view of the engine mounting, corresponding to FIG. 2, according to a third embodiment. In this embodiment, the same insert body as that in the first embodiment is used, and the partition member 8 is provided with an elastic membrane 50 to absorb the rise in internal pressure in the main fluid chamber 10. Namely, on an upper wall 51 provided on the upper section of a cylindrical section 12 is made a through-hole 52. The elastic membrane 50 is inserted between the upper wall 51 and a pressure plate 13 so that it can be secured at its periphery and elastically deformed depending on the liquid pressure in the main fluid chamber 10, thereby absorbing the internal pressure in the main fluid chamber 10.

A first orifice 15 is formed at each outer peripheral section of the cylindrical section 12 and the pressure plate 13 to communicate with the main fluid chamber 10 and the sub-fluid chamber 11. A ring 31 of a C-shaped cross-section is integrally embedded in the end of the elastic body section 7. Only the lower surface of the ring 31 is exposed and mounted on a step 53 formed on the outer periphery of the cylindrical section 12 which forms the partition member 8, for positioning. The end of the elastic body section 7 contacts the inner surface of the second connecting member 5 and the lower end section of the fluid chamber cover 22 for sealing. Another ring 32 is integrally imbedded in the outer peripheral section of the end wall 21 and secured by a caulking section 33 which is formed by bending the upper end of the second connecting member 5 inwards.

The section of the second connecting member 5 lower than the partition member 8 is formed with a narrower diameter section 54. The ring 31 provided on the outer peripheral section of the partition member 8 is mounted on a step section 55 which is formed at the boundary section of the narrower diameter section 54 and the upper section of the narrower diameter section 54. The fluid chamber cover 22 is inserted between the upper and lower rings 31, 32 and secured by a caulking section 33 provided on the upper section of the second connecting member 5. Provided on the narrower diameter section 54 side are the cylindrical section 12 and the pressure plate 13 which are overlapped on the lower side of the ring 31. An enlarged section formed on the outer periphery of the diaphragm 9 overlaps on the lower end section of the pressure plate 13 to provide an integral body by forming a caulking section 55.

In this manner, in the cone-shaped mounting section, damping by the liquid column resonance in the first orifice 15 and the membrane resonance by the thin section 26 can be expected in the same manner as in each embodiment described above. Further, when large vibrations are input from the Z-axis direction, the elastic membrane 50 is elastically deformed to absorb the rise in internal pressure within the main fluid chamber 10 and, as a result, the low dynamic spring effect in the cone-shaped mounting section 1 is further promoted.

Figure 14:
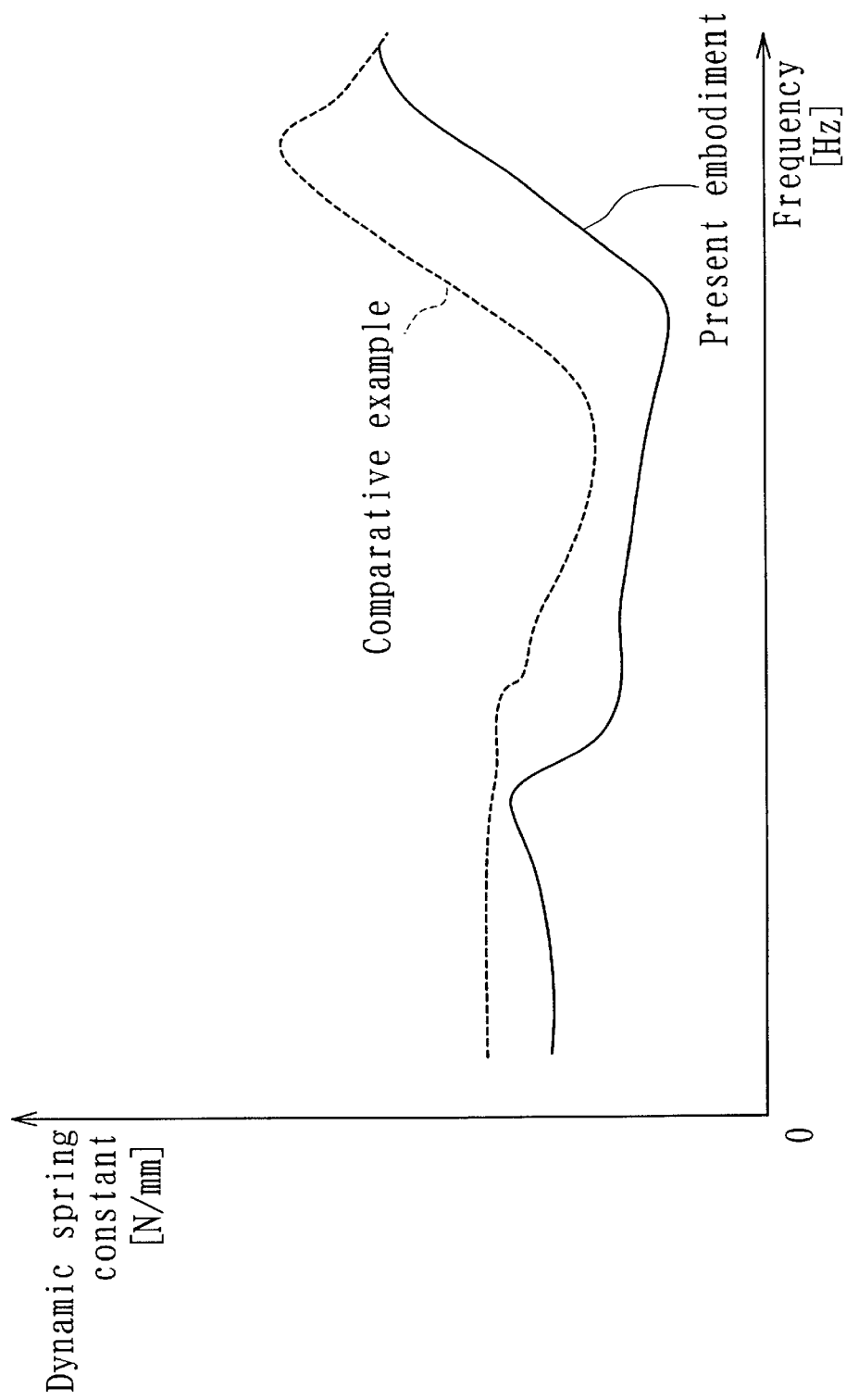
FIG. 14 is a graph showing an action effect of the third embodiment.

FIG. 14 is a graph showing this dynamic spring characteristic, in which the vertical axis shows the dynamic spring constant and the horizontal axis shows the frequency. A solid line in the figure is a characteristic curve showing a change of the dynamic spring constant according to the present embodiment. A broken line is a characteristic curve, corresponding to the first embodiment, of a comparative example, in which the elastic membrane 50 is removed from the present embodiment. As is obvious from this graph, in the present embodiment, the existence of the elastic membrane 50 can contribute to further realization of the low dynamic spring effect.

Figure 9:
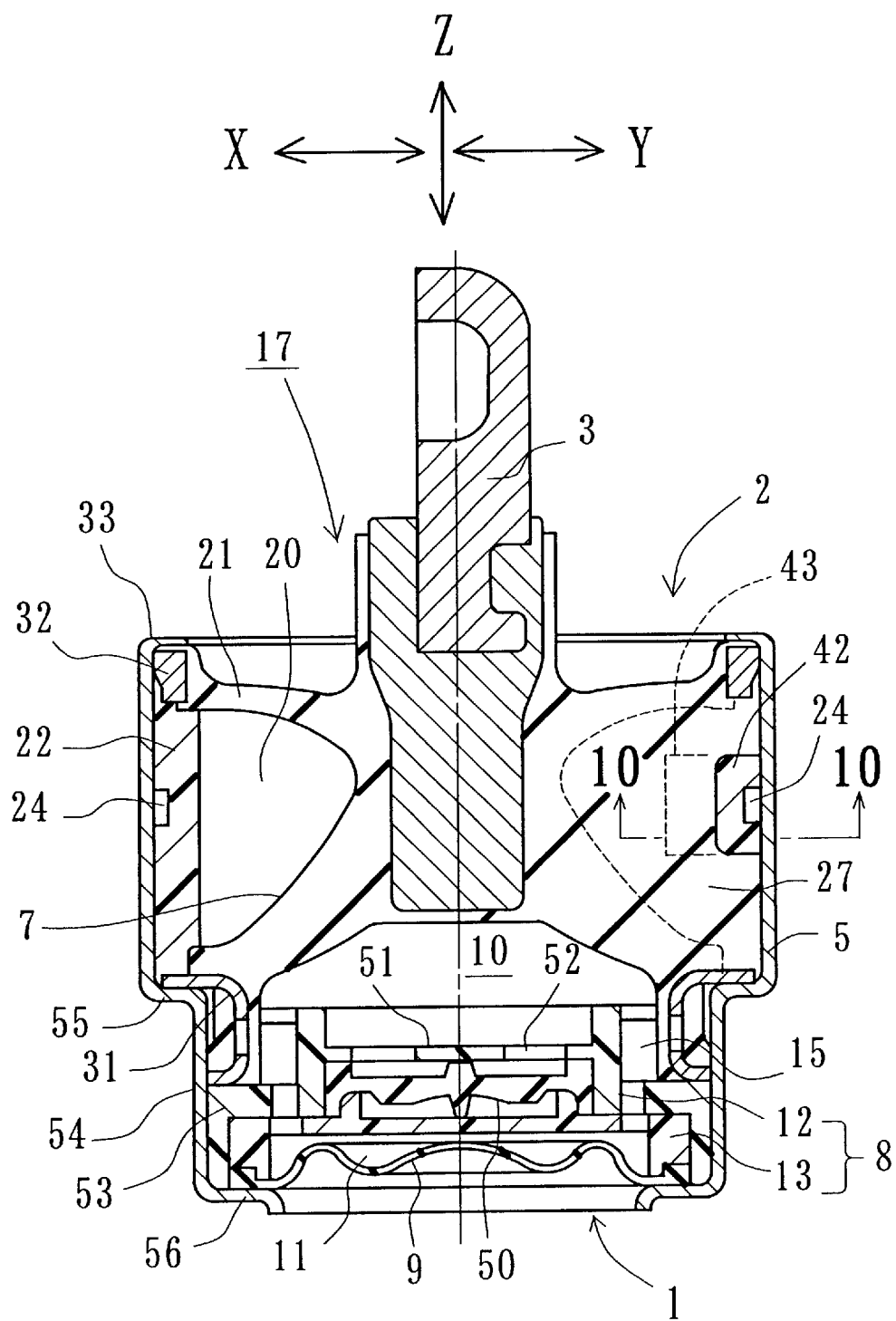
FIG. 9 is a cross-sectional view, corresponding to FIG. 8, according to a fourth embodiment.

FIG. 9 is a cross-sectional view of the engine mounting, corresponding to FIG. 8, according to a fourth embodiment, in which the same insert body 17 as in the second embodiment is provided, and the same elastic membrane 50 as in the third embodiment is also provided. In this embodiment, the end of the elastic partition wall 27 which is the outer side in the radial direction of the cylindrical bushing section 2 is caused to engage the fluid chamber cover 22 to secure it.

Figure 10:
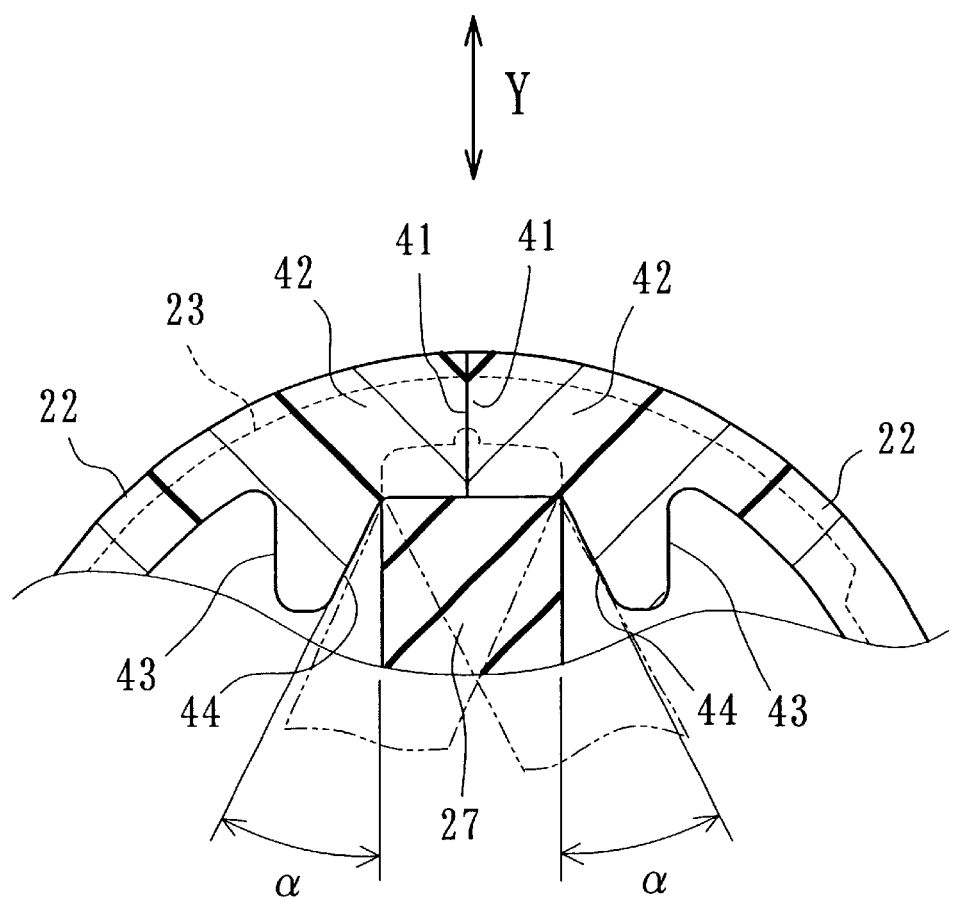
FIG. 10 is a cross-sectional view taken along line 10—10 of FIG. 9.

FIG. 10 is an enlarged cross-sectional view (i.e. the cross-sectional view taken along line 10—10 of FIG. 9) of the engagement of the elastic partition wall 27 with the fluid chamber cover 22. Each connecting end section 41 of a pair of fluid chamber covers 22 is overlapped on the outer side of the end section 40 of the elastic partition wall 27. In this example, each fluid chamber cover 22 is provided with a projecting section 43 projecting from a seat section 42 to engage the end section 40 of the elastic partition wall 27. The inner surface 44 of the projecting section 43 is provided with a taper at an angle of $\alpha$ by which the space made between the elastic partition wall 27 and the inner surface 44 is gradually narrowed toward the outer direction.

In this manner, when the elastic partition wall 27 is elastically deformed in the front and rear direction, a spring value can be set to increase the amount of elastic deformation for smaller vibrations. When the vibrations are so large as to allow the elastic partition wall 27 to contact the inner surface 44, the spring value can be increased by controlling further elastic deformation so that the spring value can be changed linearly. By adjusting the taper angle of the inner surface 44 or the amount of projection of the projecting section 43 toward the center, the spring value for larger vibrations can be set selectively.

Figure 15:
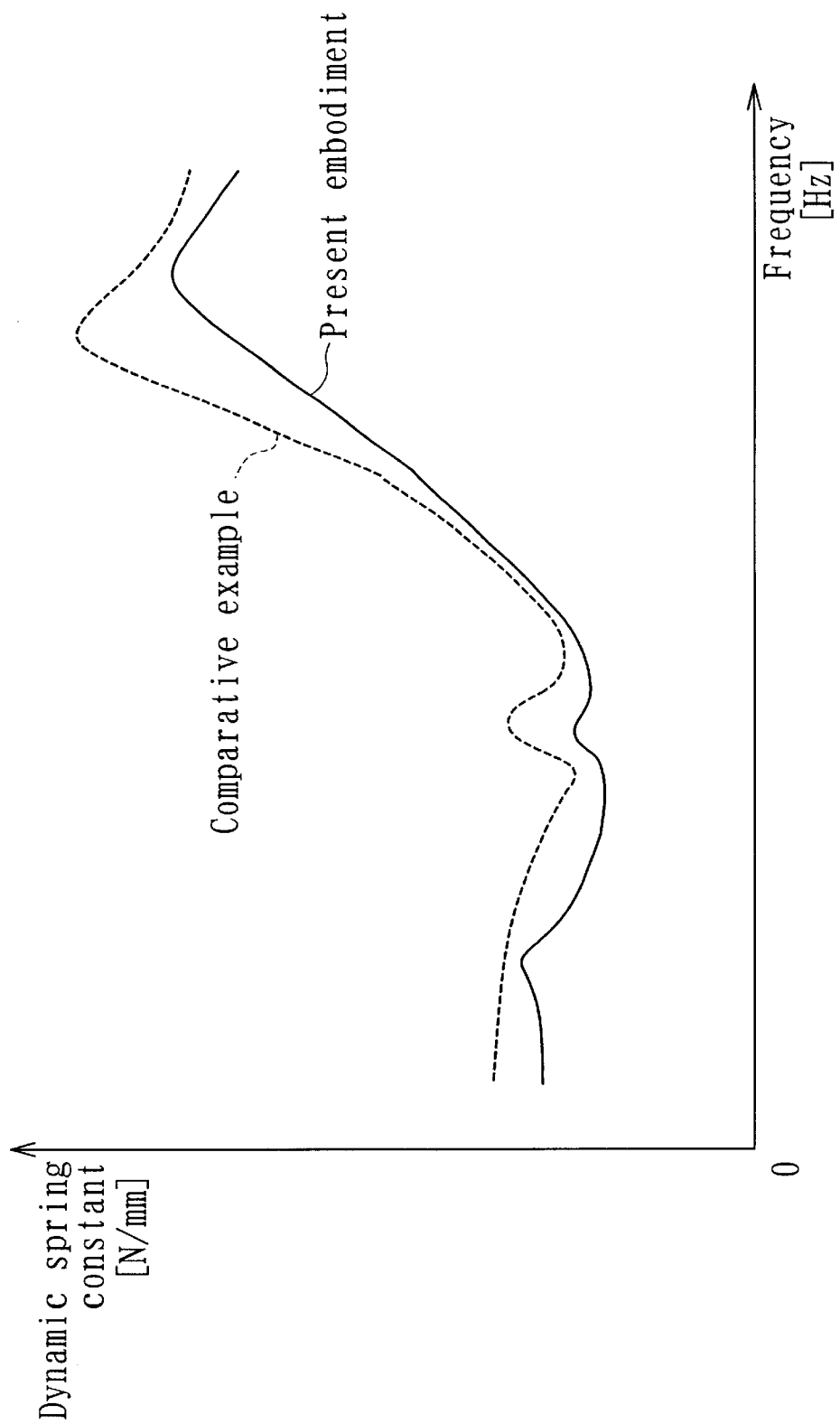
FIG. 15 is a graph showing an action and effect of the fourth embodiment.

Further, by the realization of the low dynamic spring effect of the cone-shaped mounting section 1 by the elastic membrane 50 and by non-linearly changing the spring value of the elastic partition wall 27 in the cylindrical bushing section 2, it is possible to realize the entire low dynamic spring effect for smaller vibrations. FIG. 15 is a graph showing the dynamic spring characteristics, in which the vertical axis shows the dynamic spring constant, and the horizontal axis shows the frequency. A solid line in the figure is a characteristic curve showing a change of the dynamic spring constant in the present embodiment. A broken line is a characteristic curve, corresponding to the second embodiment, of a comparative example in which the elastic membrane 50 and the fixed structure of the elastic partition wall 27 are removed from the present embodiment. As is obvious from this graph, it is possible to realize a further low dynamic spring effect in the present embodiment.

Figure 11:
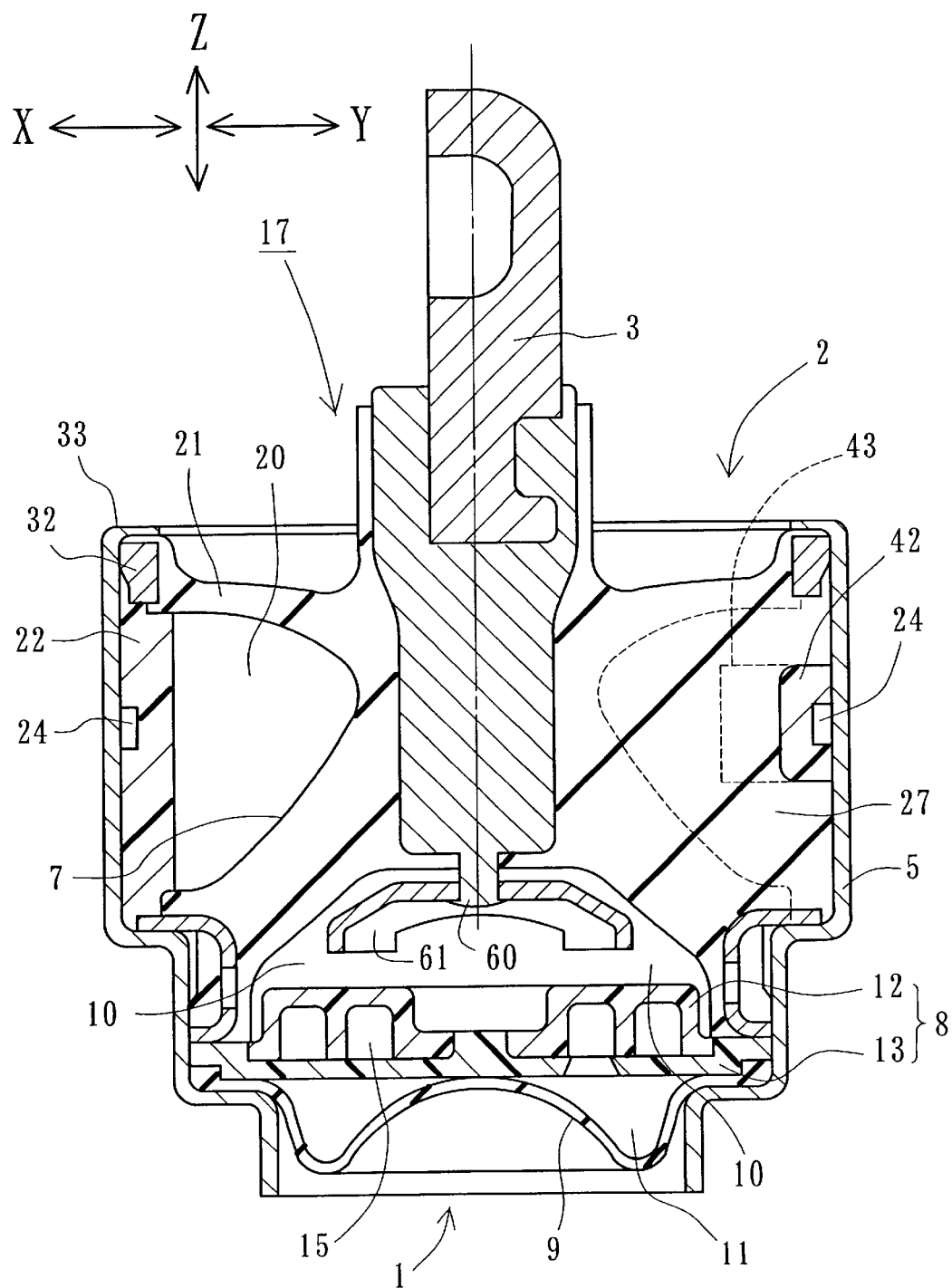
FIG. 11 is a cross-sectional view, corresponding to FIG. 8, according to a fifth embodiment.

FIG. 11 is a view of the engine mounting, corresponding to FIG. 8, according to a fifth embodiment. However, the insert body according to the second embodiment is used here. In this embodiment, the lower end section 60 of the first connecting member 3 projects within the main fluid chamber 10 and an umbrella-shaped disc member 61 is secured to the projecting end of the lower end section 60 by caulking or the like. The disc member 61 is a known member for absorbing the medium and high frequency vibrations and vibrates integrally with the first connecting member 3 within the main fluid chamber 10. The partition member 8 is provided with the first orifice 15 to communicate with the main fluid chamber 10 and the sub-fluid chamber 11.

Figure 16:
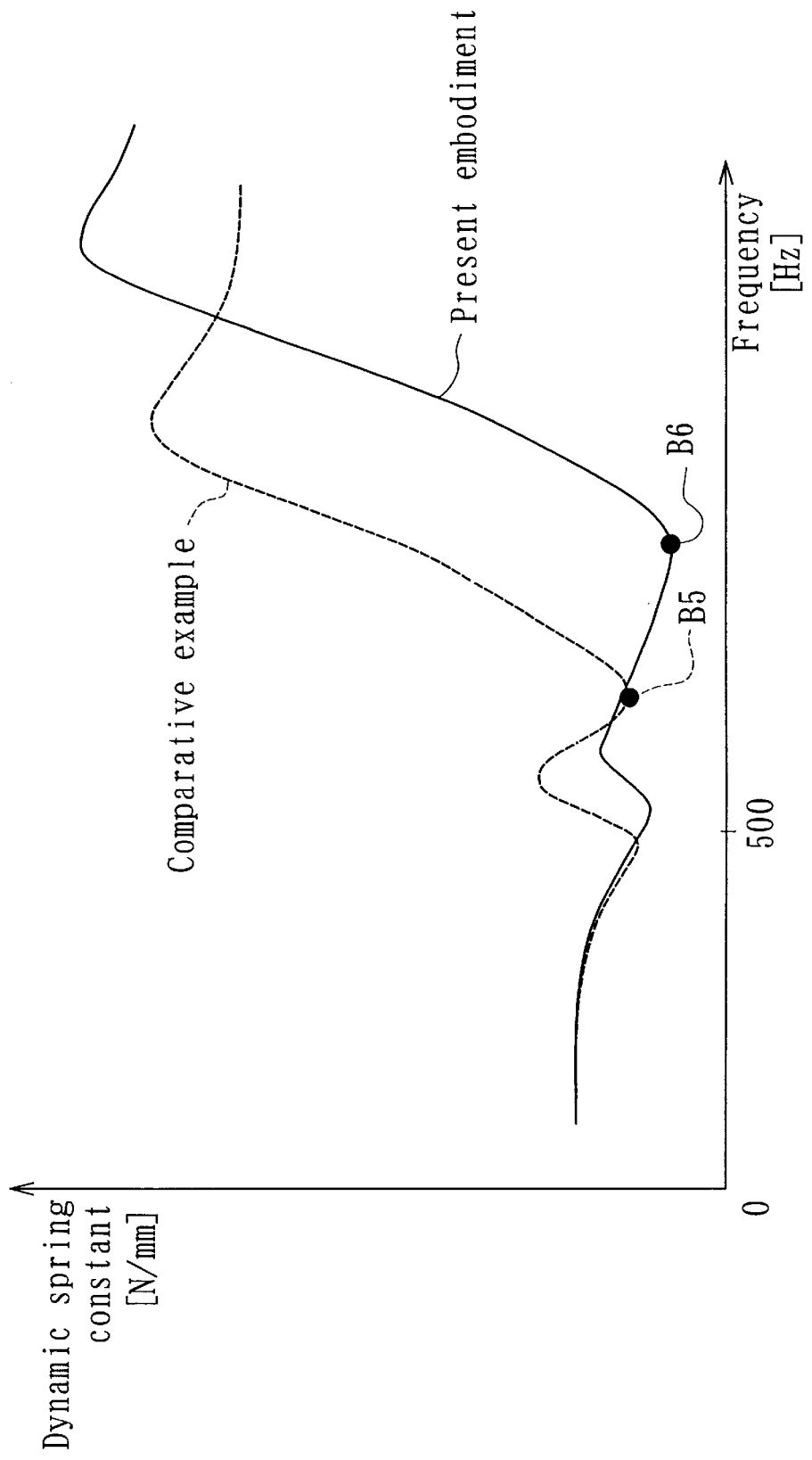
FIG. 16 is a graph showing an action and effect of the fifth embodiment.

FIG. 16 is a graph showing the dynamic spring characteristics, in which the vertical axis shows the dynamic spring constant, and the horizontal axis shows the frequency. A solid line in the figure is a characteristic curve showing a change in the dynamic spring constant according to the present embodiment. A broken line is a characteristic curve, corresponding to the second embodiment, of a comparative example in which the disc member 61 is removed from the present embodiment. As is obvious from the graph, when the disc member 61 is not provided, the dynamic spring bottom B5 is generated by the thin elastic body section 7 near 500 Hz which is the medium to high frequency band. Originally, a sudden rise of anti-resonance is expected on the higher frequency side from this point, but the dynamic spring bottom B6 is moved to the higher frequency side by the coupled resonance of the disc member 61. Accordingly, it is possible to realize the low dynamic spring effect until the higher frequency side more than 500 Hz.

It is to be noted that the present invention is not limited to the embodiments described above, but can be applied to various deformations or applications within the principle of the invention. For example, the present invention is effective for the fluid-sealed anti-vibration device in which the cone-shaped mounting section 1 is not provided, but only the cylindrical bushing section 2 is provided. In this case, it is possible to control the spring ratio in two directions, i.e. the front and rear direction and the lateral direction, in such a use condition as seen in each embodiment above.

Further, it is to be noted that the cylindrical bushing section 2 can be selectively situated. For example, the cross-sectional direction of the elastic partition wall 27 in FIG. 7 can be arranged toward the front and rear direction or the vertical direction of the car body. In this case, it is natural that the spring ratio be different from above.

Figure 17:
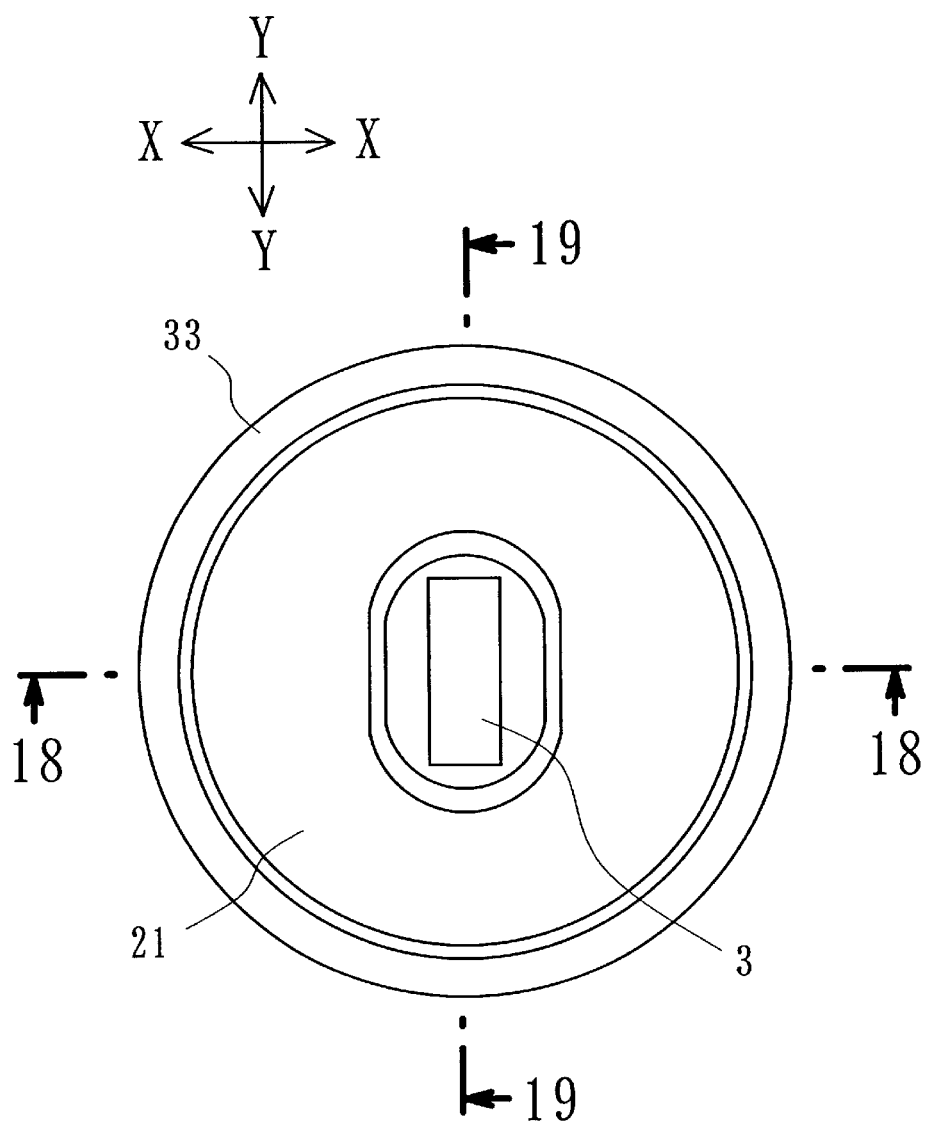
FIG. 17 is a plan view of an engine mount according to a sixth embodiments of this invention.
Figure 20:
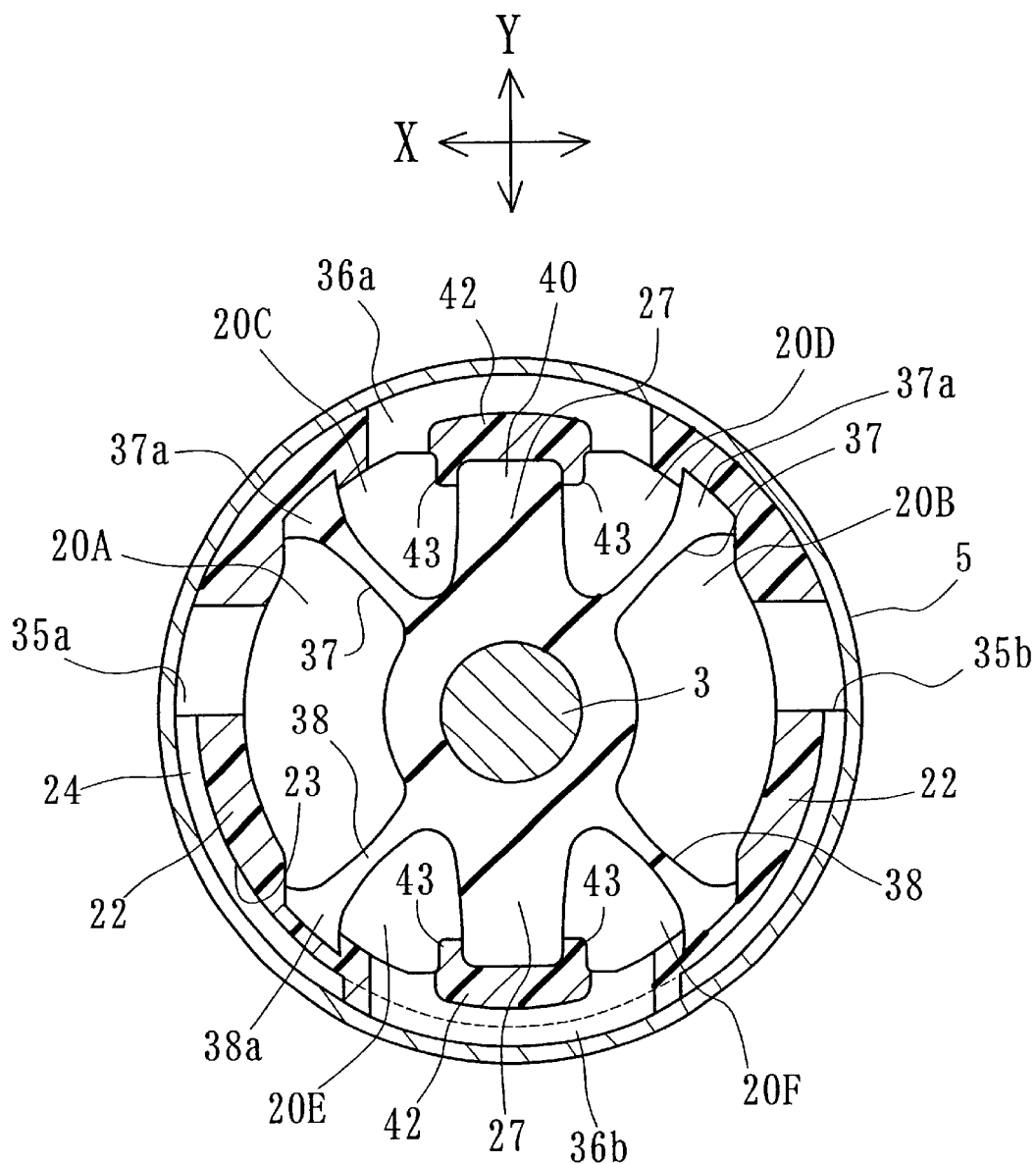
FIG. 20 is a sectional view taken along the line 20—20 in FIG. 18.
Figure 21:
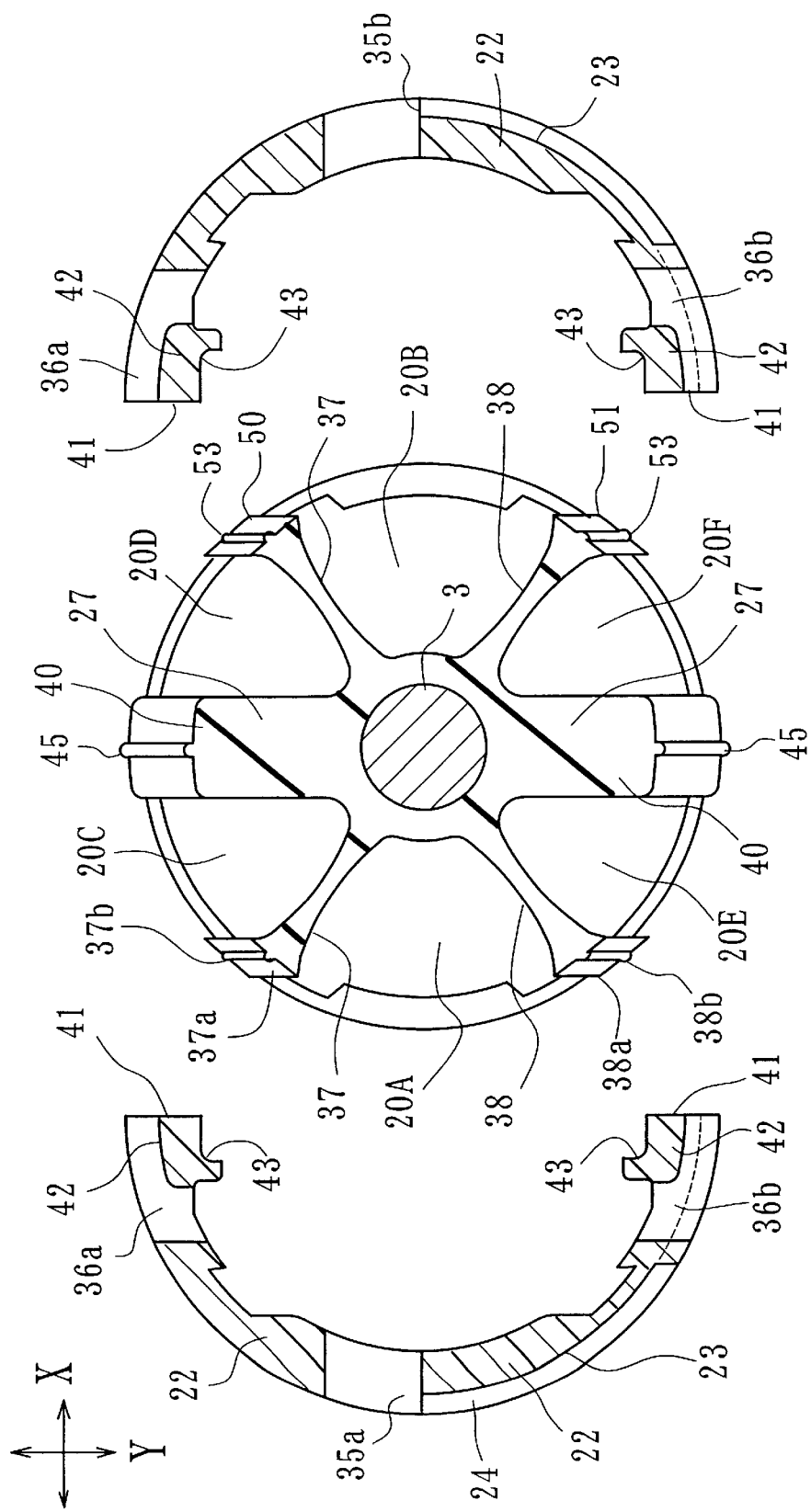
FIG. 21 is an assembling view of an insert body at a section of FIG. 20.

A sixth embodiment according to the engine mount of an automobile, in which a recessed section is eliminated, will be described referring to the attached drawings. FIG. 17 is a plan view of the engine mount viewed from the side that becomes the upper side when mounting the engine mount on a vehicle body in the direction of an axis Z, FIG. 18 is a sectional view taken along the line 18—18 in FIG. 17, FIG. 19 is a sectional view taken along the line 19—19 line in FIG. 17, FIG. 20 is a sectional view taken along the line 20—20 in FIG. 18 and FIG. 21 is a sectional view of a portion similar to FIG. 7.

In these figures, the engine mount is a united body comprising a conical mounting portion 1 and a bushing portion 2. The conical mounting portion 1 has a first mounting member 3 that is connected to the engine side, a second mounting portion 5 that is composed as a rigid cylindrical outer frame to enclose the periphery of the first mounting member with a space provided, and a nearly conical elastic main body portion 7 connecting these first and second mounting members 3 and 5.

The direction of the shaft center of the first mounting member 3 agrees with the main vibration input direction z in the conical type mounting portion 1, the portion buried in the elastic main body portion 7 has a cylindrical shape and its lower portion is thinner than the stepped portion provided at the upper portion and is extended along the axial direction Z. The portion projecting from the elastic main body portion 7 of the first mounting member 3 is flat and connected to a stopper that is not illustrated.

Figure 18:
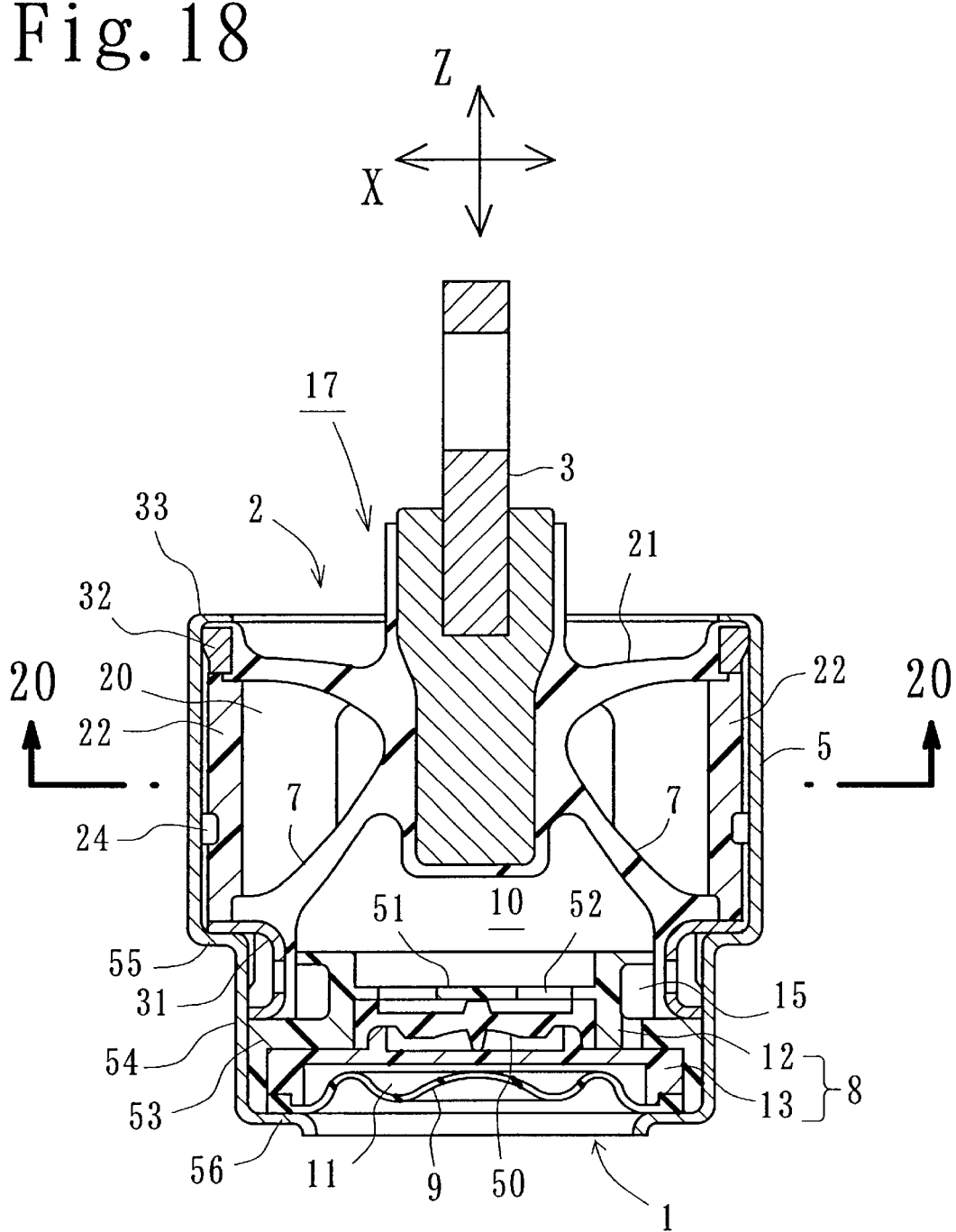
FIG. 18 is a sectional view taken along the line 18—18 in FIG. 17.
Figure 19:
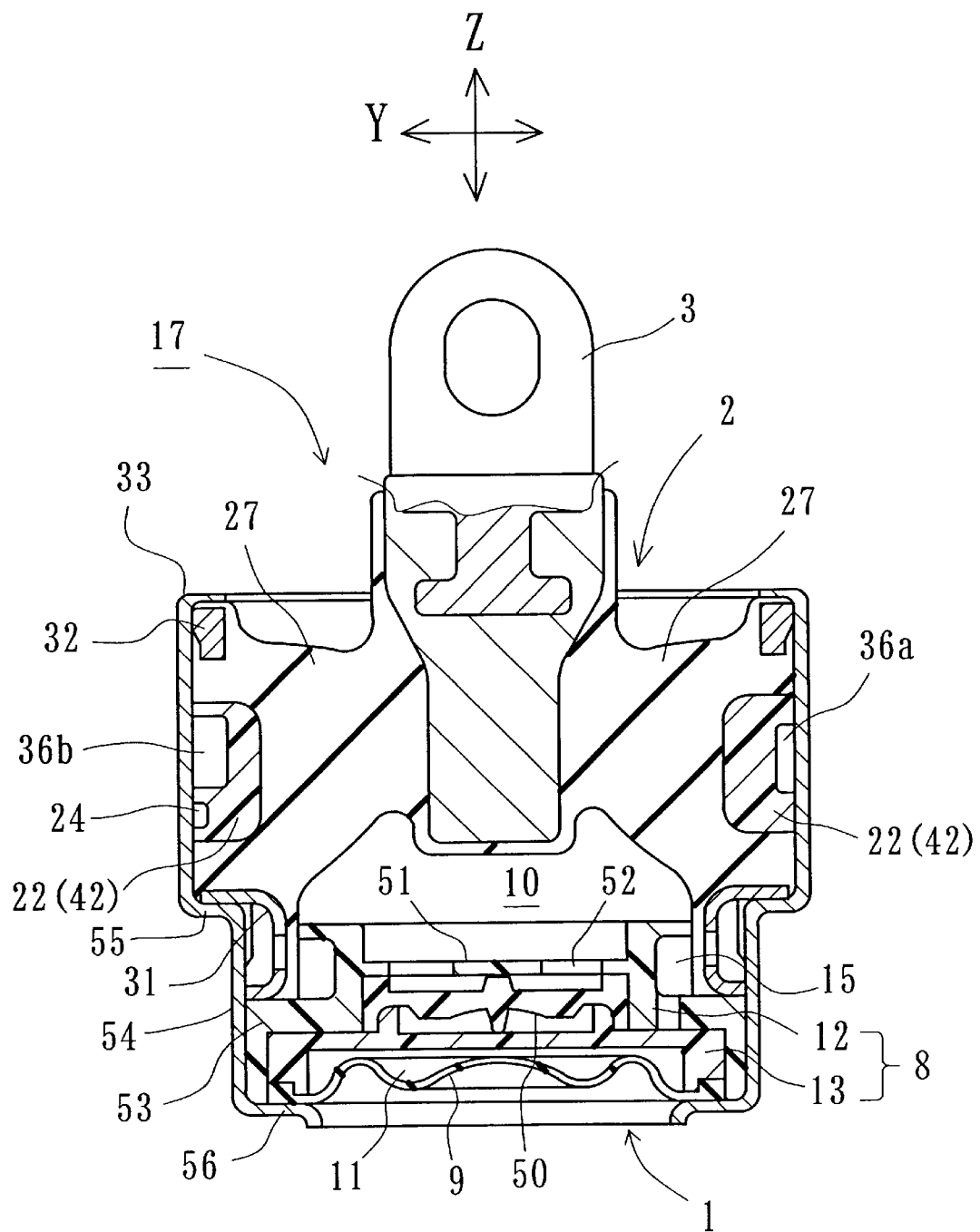
FIG. 19 is a sectional view taken along the line 19—19 in FIG. 17.

The almost conical space formed by the elastic main body portion 7 is a fluid chamber that opens downwards as shown in FIGS. 18 and 19, and a partition member 8 and a diaphragm 9 are provided in this open portion. Provided between the inner wall of the elastic main body portion 7 and the partition member 8 is a main fluid chamber 10 of which part of the elastic wall is the elastic body section 7. A space between the partition member 8 and the diaphragm 9 is a sub-fluid chamber 11. The inside of the fluid chamber is divided into the main fluid chamber 10 and the sub-fluid chamber 11 by the partition member 8.

The elastic main body portion 7 is an elastic wall covering the main fluid chamber 10, which is formed relatively thinly and its membrane characteristics are set so as to generate membrane resonance by the vibration input in a middle frequency area. The partition member 8 comprises a cylindrical portion 12 made of resin and a presser plate 13 which has a smaller diameter than the cylindrical portion 12 which fit therein from the sub-fluid chamber 11. A first orifice passage 15 is formed on the periphery of the cylindrical portion 12 for keeping the main fluid chamber 10 and the sub-fluid chamber 11 in constant communication and functions as a damping orifice.

An upper wall 51 formed on the upper part of the cylindrical portion 12 is provided with a through-hole 52. Between this upper wall 51 and the presser plate 13, an elastic membrane 50 is provided. The periphery of this elastic membrane is stationary and can be elastically deformed according to fluid pressure in the main fluid chamber, so as to absorb the inner pressure in the main fluid chamber 10.

A plurality of side fluid chambers 20 (total 6 chambers in the present embodiment) are formed on the periphery of the elastic main body portion 7 of which the outer wall is a part of the elastic wall. The section of this side fluid chamber 20 opened to the side forms a nearly triangular space as illustrated and is closed by an end portion wall 21 that is integrally formed with the elastic main body portion 7 and expanded in a nearly horizontal direction and a resin fluid chamber cover 22 that is fitted to the side opening portion.

As illustrated in FIG. 20, three units of the side fluid chamber 20 are provided for the front and rear portions at the center, left and right sides, respectively. Hereafter, a subscript A is assigned to the front side center, B to the rear side, C to the front right side, D to the rear right side, E to the front left side and F to the rear left side chambers. The front and rear central fluid chambers have the maximum capacity, and the capacities of the other fluid chambers are less and almost equal.

The fluid chamber cover 22 is closely fitted to the inner surface of the second mounting member 5 in a circular shape at about ½ the circumferential distance. The surface of fluid chamber cover 22 contacting the second connecting member 5 (hereinafter referred to as an "outer surface") is provided with a grove 23 extending in the circumferential direction which opens to the second mounting member 5 side. A second orifice passage 24 is formed between the second mounting member 5 and the fluid chamber cover 22 and functions as a damping orifice likewise the first orifice passage 15.

The second orifice passage 24 communicates with the front central side fluid chamber 20A and the rear central side fluid chamber 20B. Reference numeral 35a indicates an inlet and 35b indicates an outlet. Further, the front right side fluid chamber 20C and the rear right side fluid chamber 20D communicate with a third orifice passage 36a, and the front left side fluid chamber 20E and the rear left side fluid chamber 20F communicate with a fourth orifice passage 36b.

These side fluid chambers 20 which are adjacently provided are divided by elastic partition walls 27, 37 and 38. The elastic partition wall 27 extends on the Y-axis to the opposite side at intervals of 180° relative to the central portion. The elastic partition wall 37 extends to the right side toward the oblique front and backward. The elastic partition wall 38 extends to the left side toward the oblique front and backward. Each end of the partition walls is press-fitted to the inner surface of the fluid chamber cover 22 in fluid-tight condition.

The end portion 40 of the elastic partition wall 27 is compressed against a seat portion 42 integrally formed with the connecting end 41 of the fluid chamber cover 22. The fluid chamber cover 22 is divided into the front and rear portions by the seat portion 42, and projecting portions 43 are formed opposing the respective connecting end portions. The end portion 40 is fitted and fixed between a pair of opposing projecting portions 43. Further, the third and fourth orifice passages 36a and 36b are composed of a groove formed between the adjacent seat portions 42.

However, in this embodiment, the fourth orifice passage 36b has a cross section larger than that of the third orifice passage 35, and the third orifice passage 36a is formed as an idle orifice passage that is capable of absorbing vibration during idling, which is at a higher frequency than for the second orifice passage 24, and the fourth orifice passage 36b is formed as another orifice passage that resonates at a still higher frequency, for example, a starting orifice passage that absorbs vibration at the time of starting.

As illustrated in FIG. 18 and FIG. 19, a ring 31 with a U-shaped section is integrally buried in the end of the elastic main body portion 7. The lower surface only of this ring 31 is exposed and positioned on a stepped portion 53 formed on the periphery of the cylindrical portion 12 composing the partition member 8, and the end of the elastic main body portion 7 is closely fitted to and seals the inner surface of the second mounting member and the lower end portion of the fluid chamber cover 22. Further, a ring 32 is integrally buried in the outer periphery portion of the end portion wall 21 and is secured by a caulking portion 33 that bends the upper end of the second mounting member 5 inward.

The portion of the second mounting portion 5 lower than the partition member 8 forms a small diameter portion 54. The ring 31 provided on the outer periphery edge portion of the partition member 8 is placed on a stepped portion 55 formed at the boundary portion of this small diameter portion 54 and the upper portion of the second mounting portion 5. The fluid chamber cover 22 is positioned between the upper and lower rings 31 and 32 and secured by the upper caulking portion 33. At the small diameter portion 54 side, the cylindrical portion 12 and the presser plate 13 are piled up under the ring 31. Further, an enlarged portion formed on the periphery of the diaphragm 9 is piled on the lower end portion of the presser plate 13 to provide an integral body by forming a caulking portion 56.

The elastic main body portion 7, the end portion wall 21, the elastic partition wall 27, 37 and 38 comprising the cylindrical bushing portion 2 are all constructed continuously in one integral body using the same single elastic member. Further, these elastic materials are commonly used for the conical mounting portion 1 and therefore, the elastic material portion of the conical mounting portion 1, excepting the diaphragm 9 and the elastic material portions of the cylindrical bushing portion 2, are united in one integral body and become a single insert body 17 (FIG. 21), which can be treated as a single unit when assembling this engine mount.

FIG. 21 shows the insert body 17 and the end portion wall 21 formed in a single disc shape as is apparent from FIG. 5 and FIG. 6. This insert body 17 is inserted in the second mounting member 5 after the fluid chamber cover 22 is mounted around it. Further, after the partition member 8 and the diaphragm 9 are inserted, both end opening sides of the second mounting member 5 are caulked.

At this time, the ends 40, 37a and 38a of the elastic partition walls 27, 37 and 38 projects slightly outward in the radial direction as shown in FIG. 21. When the fluid chamber cover 22 is inserted into the second mounting member 5 under pressure, these ends are compressed in the central direction and the ends 40, 37a and 38a are press fitted to the fluid chamber cover 22 to be fluid-tight. Numeral 45, 37b and 38b are seal lips.

Next, actions of this embodiment will be described. In FIG. 20, when relatively low frequency range vibration under general operation is input from the lengthwise direction, the elastic partition walls 27, 37 and 38 are elastically deformed. In this case, the capacity change in the front central side fluid chamber 20A is largest and fluid in the inside passes through the second orifice passage 24 and flows into the rear central side fluid chamber 20B. Liquid column resonance is generated in the second orifice passage 24 by the fluid flow and the vibration is damped.

Further, at idle vibration of a higher frequency, the liquid column resonance is generated in the third orifice passage 35 which communicates with the front right side fluid chamber 20C and the rear right side fluid chamber 20D and damps the vibration. At the time of starting at a higher frequency, the liquid column resonance is generated in the fourth orifice passage 36b which communicates with the front left side fluid chamber 20E and the rear left side fluid chamber 20F and the vibration at the time of starting is damped.

Figure 22:
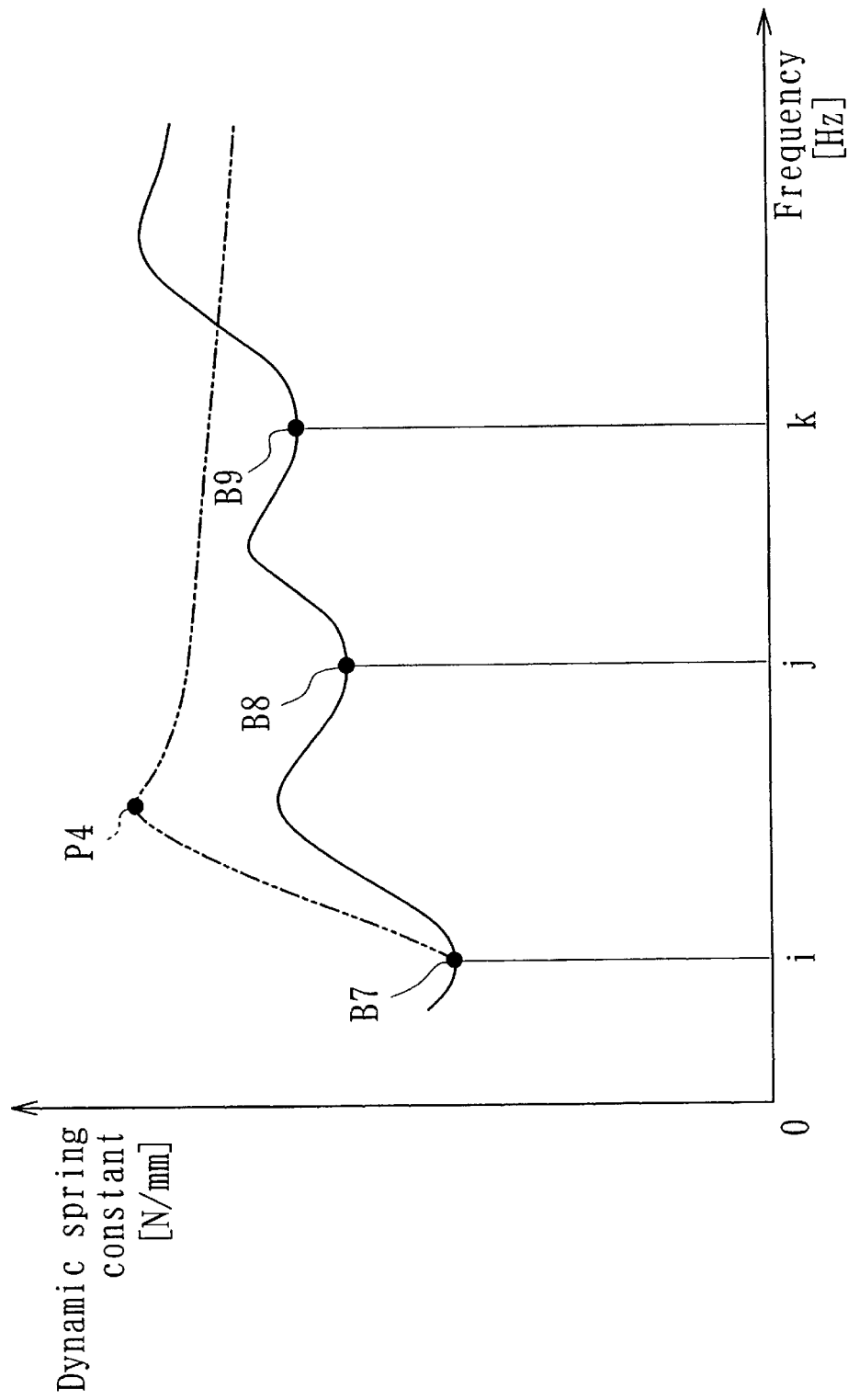
FIG. 22 is a graph for explaining the action of the sixth embodiment.

FIG. 22 is a graph showing the dynamic spring characteristic of this fluid sealed anti-vibration device. The dynamic spring constant is shown on the vertical axis and frequency is shown on the horizontal axis. Dynamic spring bottoms (the minimum values of the dynamic spring characteristic) B7, B8 and B9 are generated at intervals in the frequencies i, j and k by the liquid column resonance in the respective orifice passages. The dynamic spring bottom B7 is generated in a damping orifice passage that is the second orifice passage 24. If the dynamic spring bottom is only B7, an anti-resonance dynamic spring peak P4 (the maximum value of the dynamic spring characteristic) is formed as shown by a virtual line.

However, the dynamic spring constant is lowered by the liquid column resonance in the idle orifice passage, that is the third orifice passage 36a, as shown by the dynamic spring bottom B8. In addition, the dynamic spring constant is also lowered by the dynamic spring bottom B9 formed in the fourth orifice passage 36b on a higher frequency side. Accordingly, the influence of the anti-resonance by the damping orifice passage is reduced and the realization of a low dynamic spring effect in a wide range of frequencies is achieved.

Figure 23:
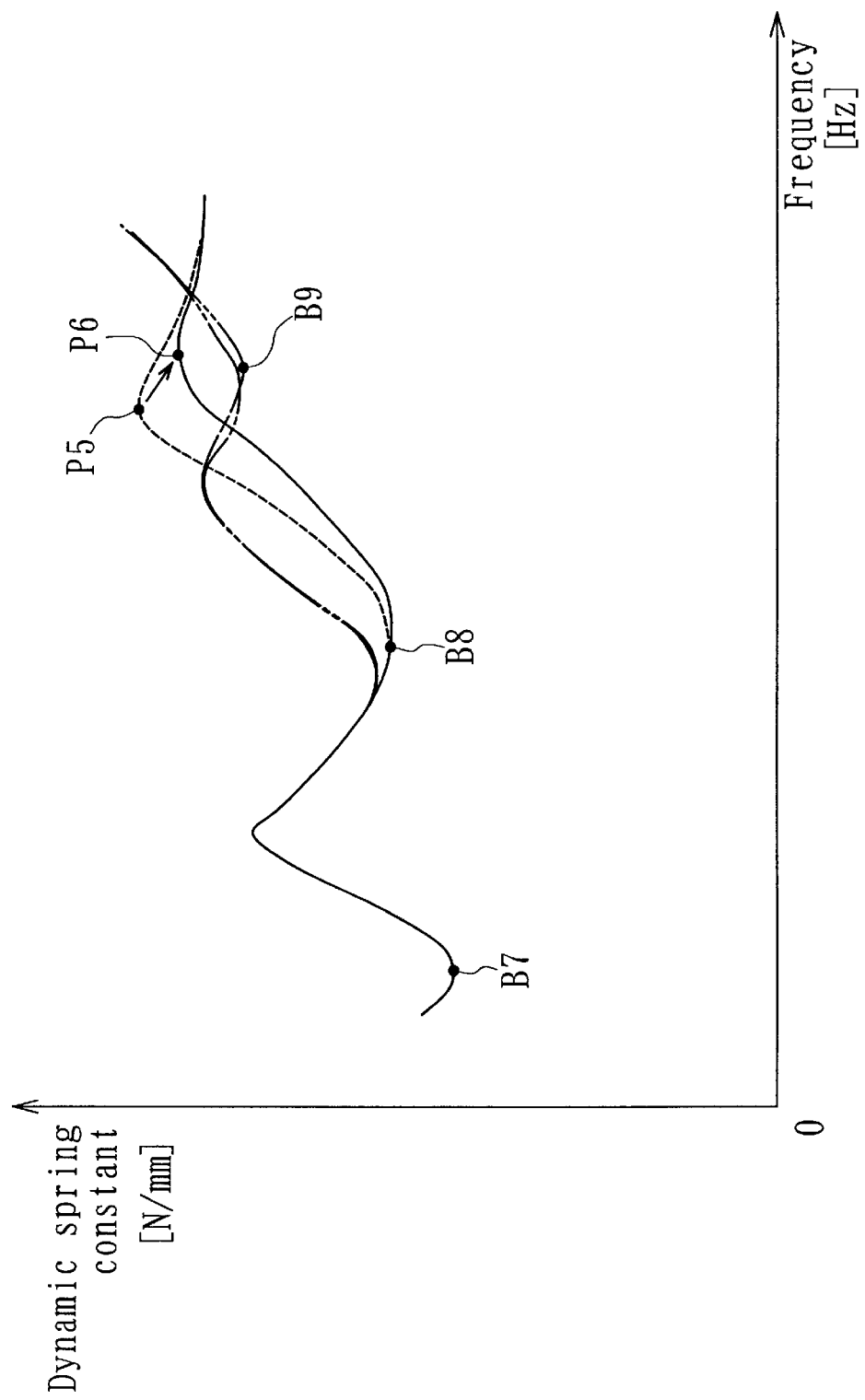
FIG. 23 is a graph for explaining the action of the sixth embodiment.

FIG. 23 is an example wherein the third orifice passage 36a is provided as an idle orifice passage and is coupled with the fourth orifice passage 36b. That is, after generating the dynamic spring bottom B7 by the damping orifice passage, the dynamic spring bottom B8 is generated again by the idle orifice passage. When this state remains unchanged, the dynamic spring peak P5 by the anti-resonance of the dynamic spring bottom B8 is generated as shown by the broken line. However, if the fourth orifice passage 36b is set so as to generate the dynamic spring bottom B9 by the liquid column resonance conforming to this dynamic spring peak P5, the dynamic spring characteristic is generated by the fourth orifice passage 36b as shown by the virtual line, and, therefore, the actual dynamic spring characteristic will become a coupled one as shown by the solid line. The dynamic spring peak P5 drops to P6. Accordingly, the influence of the anti-resonance of the idle orifice passage is reduced and a low dynamic spring effect in a wide range of frequencies is realized.

Figure 24:
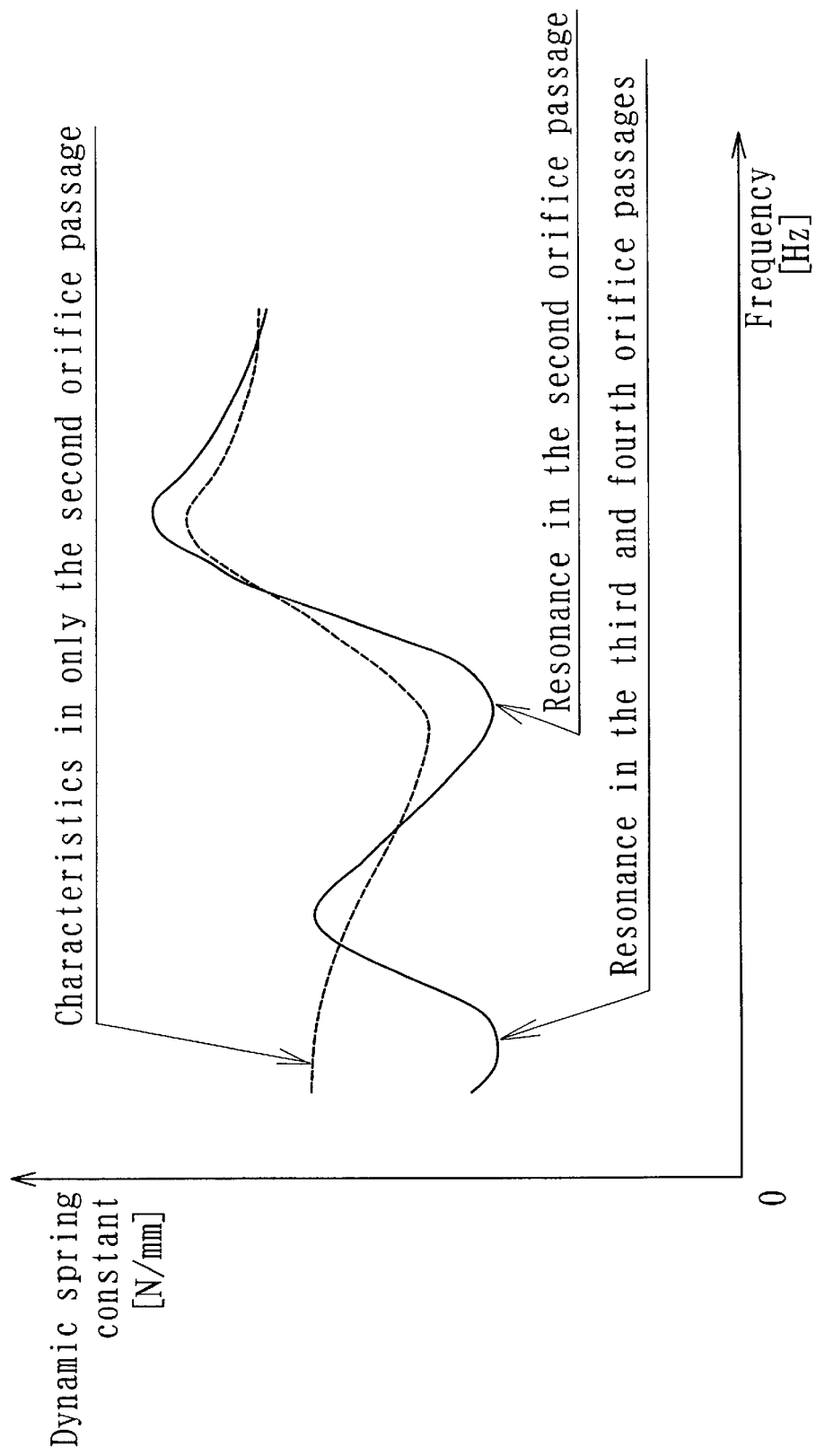
FIG. 24 is a graph for explaining the action of the sixth embodiment.

FIG. 24 shows an example wherein, for the setting of liquid column resonance frequencies for the second orifice passage 24, the third and fourth orifice passages 36a and 36b are reversed. Liquid column resonance is set in the order of the second orifice passage>the third orifice passage>=the forth orifice passage. As the liquid column resonance frequency in the second orifice passage 24 that communicates with the front and rear central side fluid chambers 20A and 20B wherein flow rate of fluid becomes highest, the wall rigidity becomes higher and liquid column resonance is generated in the third and fourth orifice passages. Accordingly, a relatively high dynamic spring constant on a low frequency side in the case of only the second orifice passage shown by the broken line can be lowered by the liquid column resonance in the third and fourth orifice passages.

Further, in the reverse case; that is, when a fluid level resonance frequency is set in the order of the second orifice passage<the third orifice passage<=the fourth orifice passage and a flow rate of fluid on the low frequency side is increased, it is possible to lower the influence of the anti-resonance. This is the same as that shown in the graph in FIG. 22.

Figure 25:
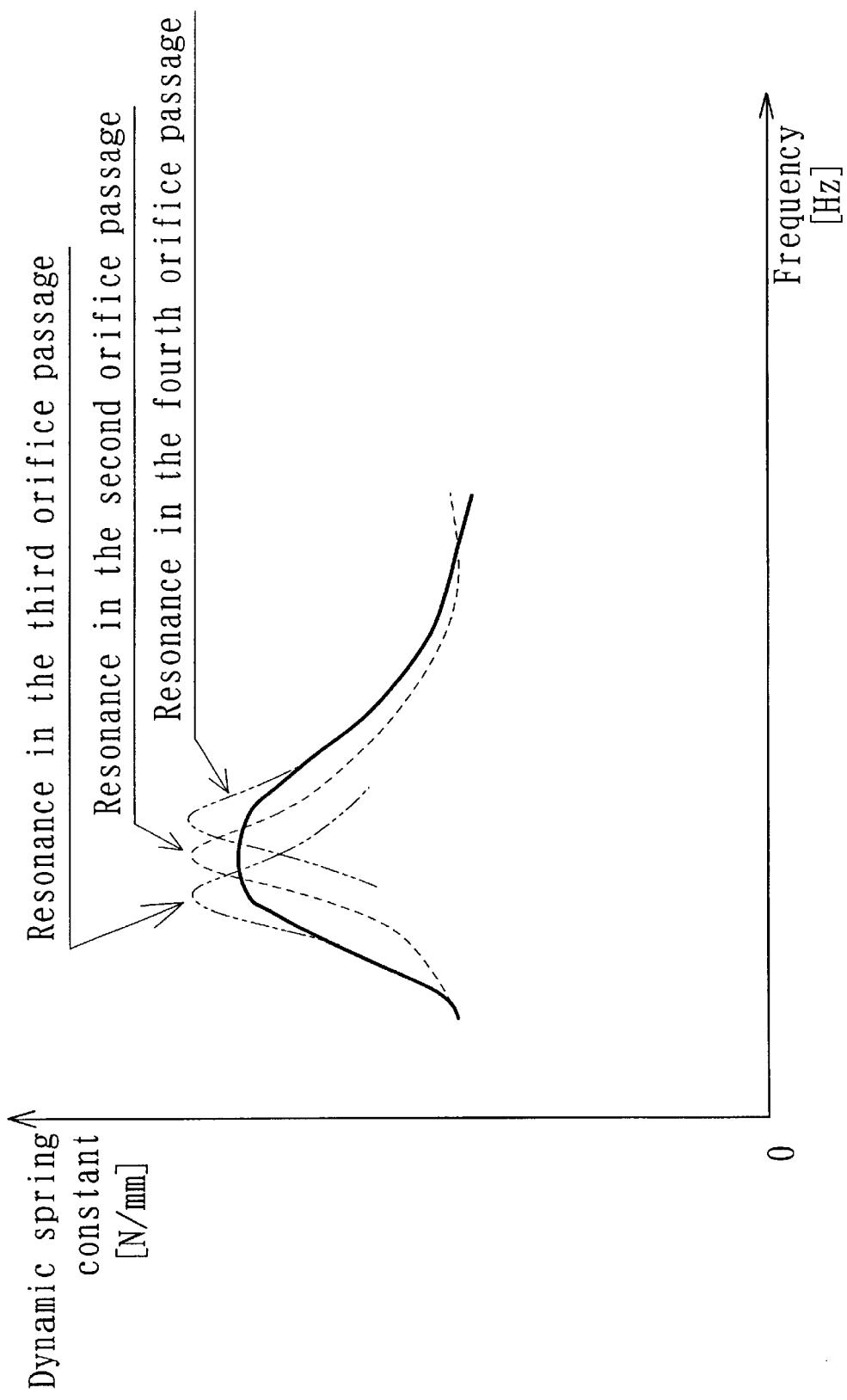
FIG. 25 is a graph for explaining the action of the sixth embodiment;.

FIG. 25 is an example of tuning in which the damping orifice passage that is the second orifice passage 24 is coupled with other orifice passages. The damping characteristics are shown by the vertical axis showing the damping coefficient and the horizontal axis showing the frequency. In the case of a single damping orifice passage only, a relatively acute angle peak is generated as shown by the broken lines. However, when the third and fourth orifice passages 36a and 36b are set so that liquid column resonance is generated at a frequency slightly differing from the second orifice passage 24, the acute angle peak of each orifice passage is slightly shifted to the high frequency side and as a result, the coupled damping characteristic achieved becomes gentle as shown by the solid line. Accordingly, the broad range of damping which affects a wide range of frequencies can be realized.

Figure 26:
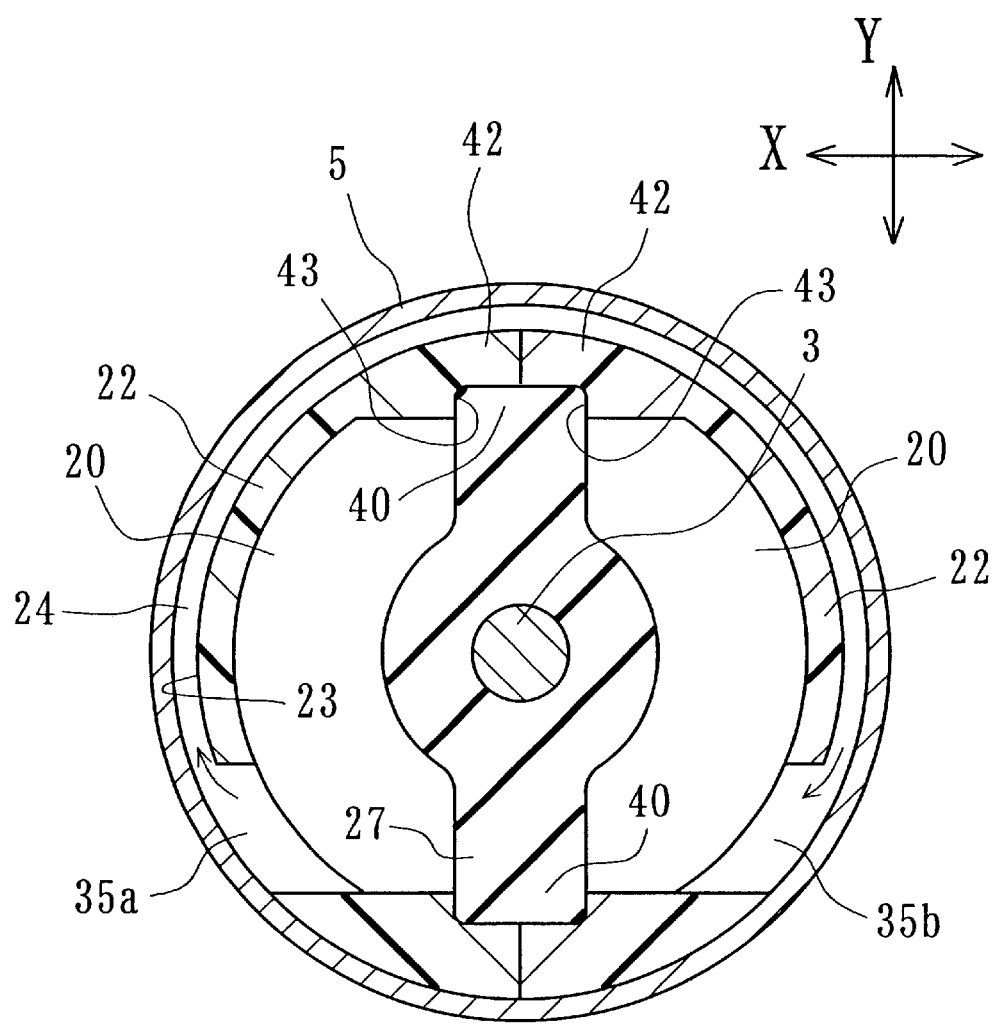
FIG. 26 is a sectional view, corresponding to FIG. 20, according to a seventh embodiment.
Figure 27:
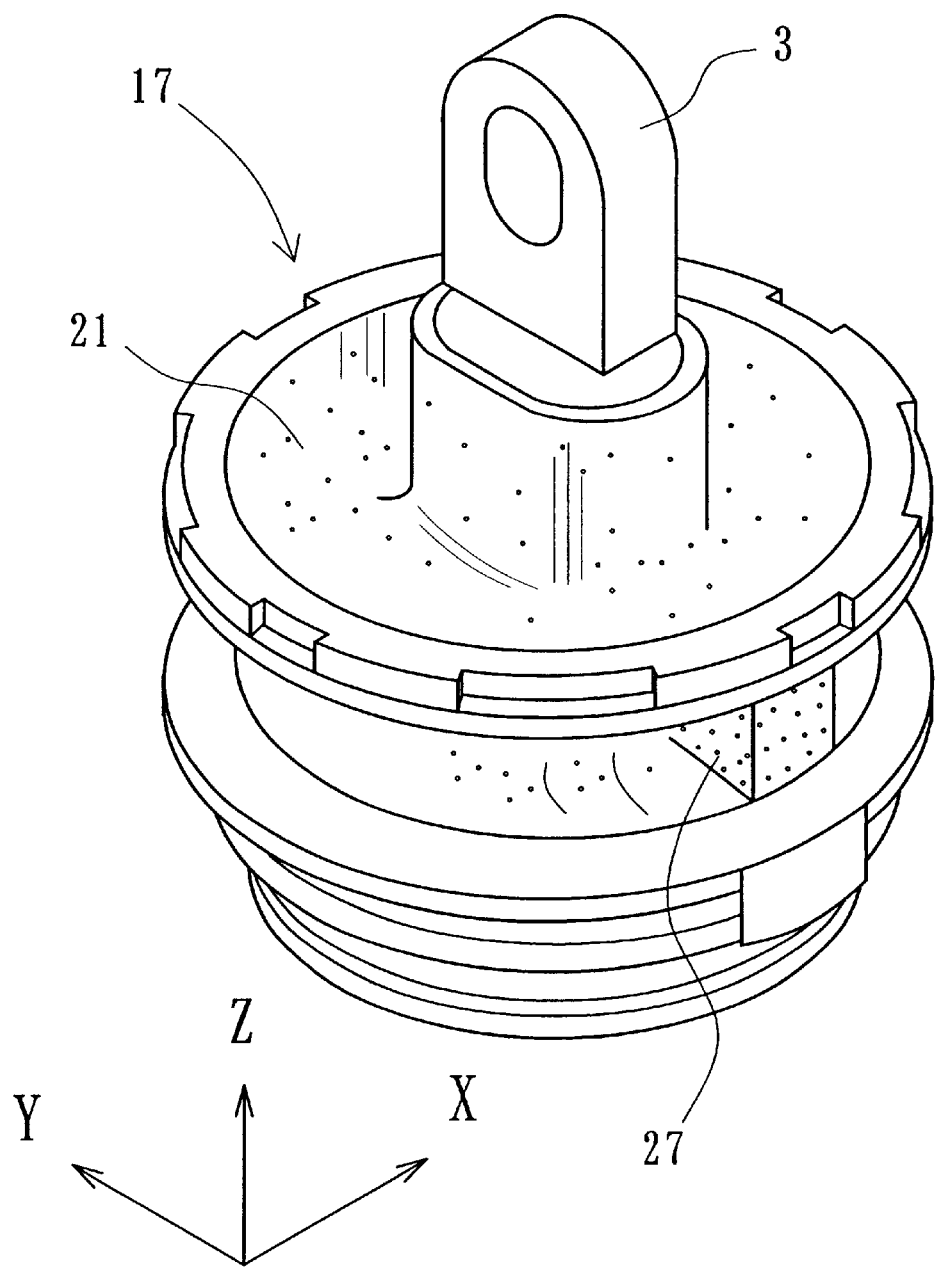
FIG. 27 is a perspective view of an insert body.
Figure 28:
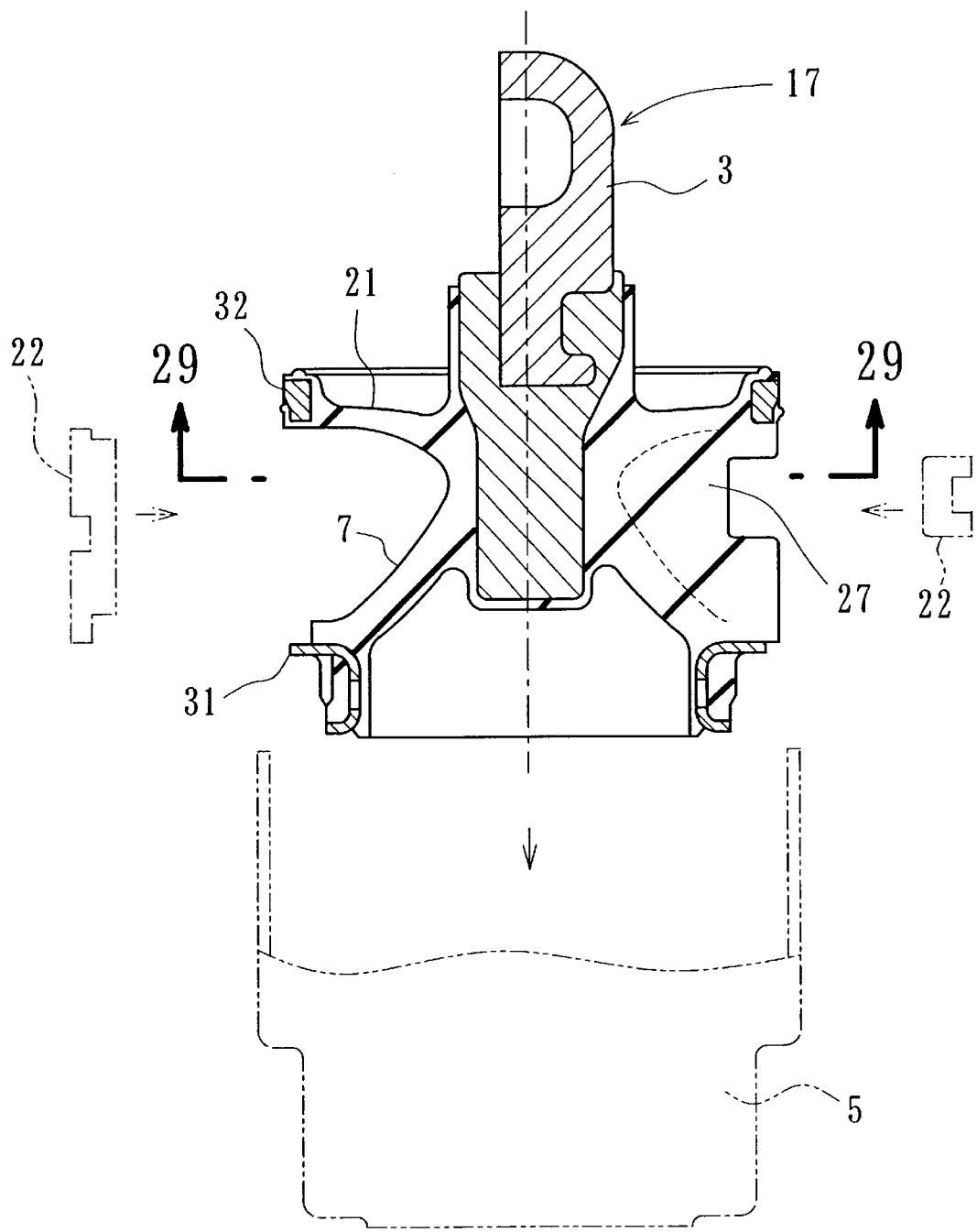
FIG. 28 is an assembling view of the insert body.
Figure 30:
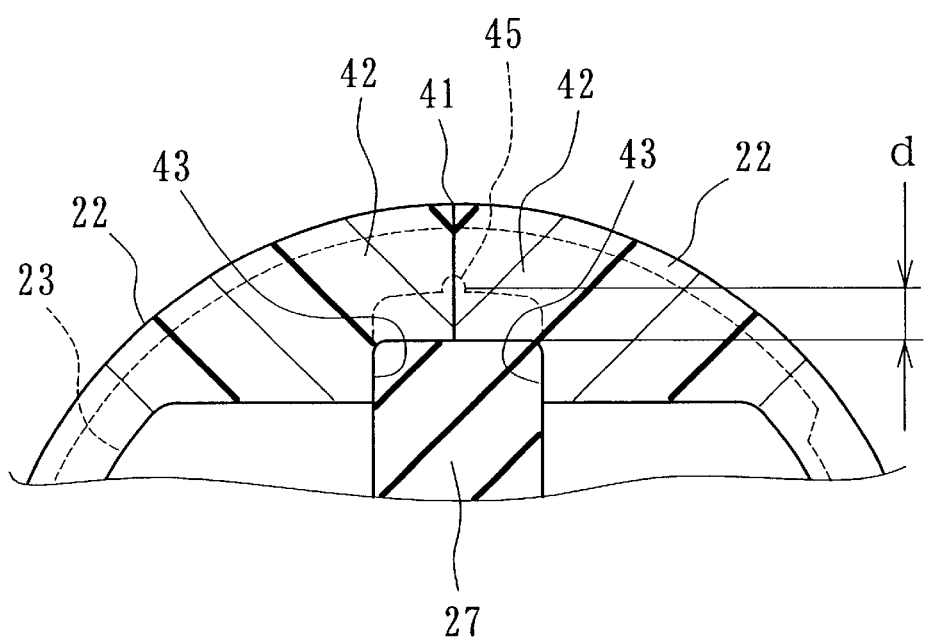
FIG. 30 is a partially enlarged sectional view corresponding to FIG. 10.

Next, a seventh embodiment that is constructed as an engine mounting for a vehicle will be described, in which two liquid chambers are formed in the lateral direction by an elastic partition wall extending in the front and rear direction along a diameter similar to the second embodiment (FIG. 5 through 7). A sectional construction of the engine mount is similar to that of FIG. 9. FIG. 26 is a sectional view in a similar portion of FIG. 7, FIG. 27 is a perspective view of an insert body similar to FIG. 4, FIG. 28 is a view showing the assembly method of the insert body at a section of FIG. 26 as like FIG. 7 and FIG. 30 is a view showing a fixing construction of an end section of the elastic partition wall.

Since the sectional construction of this engine mount is similar to that of FIG. 9 and is characterized in the fixing construction of the end section of the elastic partition wall, hereinafter explanation of the entire structure is omitted and only changed portion will be explained.

As shown in FIG. 26, the fluid chamber cover 22 is closely fitted, in an arc shape, on the inner circumference of the second connecting member 5 in about ½ of the circumferential distance. The surface of the fluid chamber cover 22 contacting the second connecting member 5 (hereinafter referred to as "an outer surface") is provided with a groove 23, extending in the circumferential direction, which opens to the second connecting member 5 side. A second orifice 24 is formed between the fluid chamber cover 22 and the second connecting member 5.

The second orifice 24 is formed in the circumferential direction along the inner surface of the second connecting member 5 and always communicates with each fluid chamber 20 through an inlet 35a which opens to the front side fluid chamber 20 and an exit 35b which opens to the rear side fluid chamber 20. The second orifice 24 functions as a damping orifice in the same manner as the first orifice 15.

The pair of opposed side fluid chambers 20, 20 is divided by an elastic partition wall 27. The elastic partition wall 27 extends to the opposite side on the Y-axis at intervals of 180° relative to the central section, and an end section thereof is press-fitted to a seat section 35 which is integrally formed with the fluid chamber cover 22. The fluid chamber cover 22 is divided into the front and rear sections at the seat section 42, and each connecting end section is provided with a cutout section 43 with which the end section 40 of the elastic partition wall 27 is engaged and fixedly secured.

The elastic partition wall 27 is not provided with such a recessed section as shown in the first embodiment (FIG. 1 and FIG. 2), and the upper section thereof continuously extends to an end wall 21 and the lower section continuously extends to the elastic body member 7. The elastic partition wall 27 is formed as a thin elastic wall which has the same membrane resonance characteristics as the elastic body member 7.

A ring 31 of a C-shaped cross-section is integrally imbedded in the end of the elastic body member 7. Only the lower surface of the ring 31 is exposed to contact a step 53 formed on the outer periphery of the cylindrical section 12 which forms the partition member 8, for positioning. The end section of the elastic body member 7 closely contacts the inner surface of the second connecting member 5 and the lower end section of the fluid chamber cover 22, for sealing. Another ring 32 is also integrally imbedded in the outer peripheral section of the end wall 21 and fixedly secured by a caulking section 33 which is formed by bending the upper end of the second connecting member 5 inward.

The section of the second connecting member 5 lower than the partition member 8 is formed with a narrower diameter section 54. The ring 31 mounted on the outer peripheral section of the partition member 8 is mounted on a step section 55 which is formed at the boundary section of the narrower diameter section 54 and the upper section of the narrower diameter section 41. The fluid chamber cover 22 is inserted between the upper and lower rings 31, 32 and they are secured by a caulking section 33 provided on the upper section of the second connecting member 5. The cylindrical section 12 and the pressure plate 13 are mounted on the narrower diameter section 54 under the ring 31. An enlarged section formed on the outer periphery of the diaphragm 9 overlaps the lower end section of the pressure plate 13. Thus, the cylindrical section 12, the pressure plate 13, and the enlarged section of the diaphragm 9 are integrally secured by a caulking section 56 formed by bending the lower end of the second connecting member 5 inward.

The elastic body member 7, the end wall 21, and the elastic partition wall 27 which form the cylindrical bushing section 2 are integrally constructed by the same single elastic material. Since the elastic material is used in common with the cone-shaped mounting section 1, the elastic material section of the cone-shaped mounting section 1 except for the diaphragm 9 and the elastic material section of the cylindrical bushing section 2 are integrally formed to provide a single insert body 17 (see FIG. 27). Thus, the insert body 45 can be handled as a single unit when the engine mounting is assembled.

FIGS. 27 through 30 show the insert body 17, in which the end wall 21 is formed in a single disk shape. As shown in FIG. 28, the fluid chamber cover 22 is first secured to the periphery of the insert body 45 and then inserted into the inside of the second connecting member 5 from the top in the figure. On the other hand, the partition wall 8 and the diaphragm 9 are inserted into the inside of the second connecting member 5 from the bottom (not shown), wherein the insert body is integrally provided by caulking the upper and lower sections of the second connecting member 5.

In this case, as shown in FIG. 30, the elastic partition wall 27 is lengthened so that it is situated in a position shown by an imaginary line projecting outward from an assembly position shown by a solid line. When the elastic partition wall 27 is press-fitted to the second connecting member 5, it is compressed until the position shown by the solid line in the central direction. Accordingly, the dimension d shown in FIG. 8 shows the interference. The elastic partition wall 27 is compressed and harder by the dimension of this interference in the Y-axis direction and as a result, a spring value becomes high in the lateral direction (i.e. the Y-axis direction).

This spring value can be selectively adjusted by setting the dimension of interference d and it is determined by the relation of each spring ratio in the front and rear direction (i.e. the X-axis direction) and the vertical direction (i.e. the Z-axis direction) of the entire fluid-sealed anti-vibration device. According to the present embodiment, each spring ratio is, for example, set as follows: Vertical direction: Front and rear direction: Lateral direction=1.0: 1.0~1.3: 1.0~3.0

This spring ratio can be freely set depending on the vehicle installed. However, it is desirable to adjust the spring ratio in the lateral direction in a range of 1.5~2.5.

The spring value in the lateral direction is that obtained when mainly the elastic partition wall 27 is elastically deformed in the lateral direction by the lateral vibrations of the vehicle. Likewise, the spring value in the front and rear direction is that obtained when mainly the elastic partition wall 27 is elastically deformed in the front and rear direction. The spring value in the vertical direction is that obtained when the elastic body member 7 is elastically deformed in the vertical direction.

Figure 29:
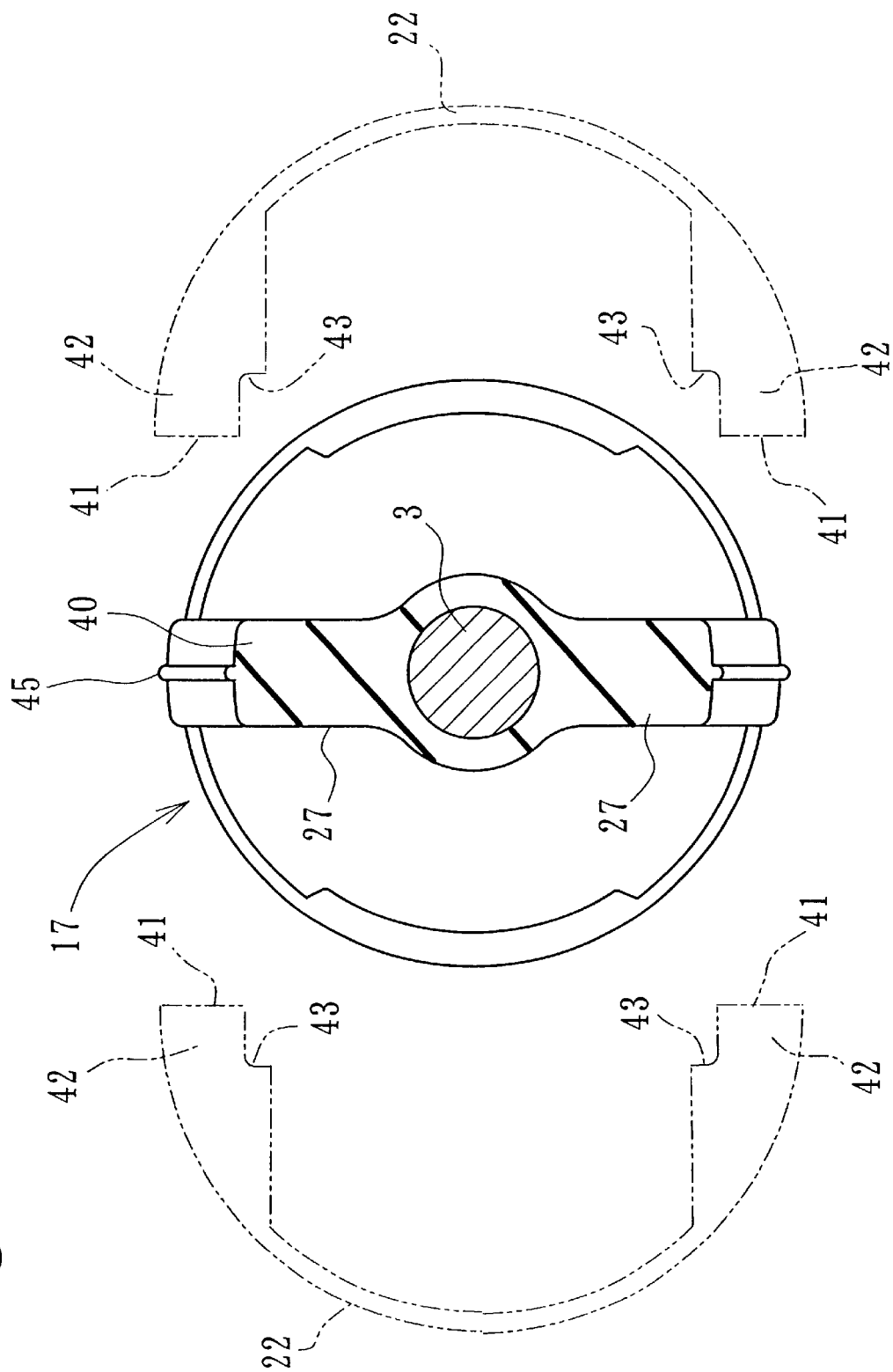
FIG. 29 is an assembling view of the insert body corresponding to FIG. 21.

Operation of the present embodiment will now be described. As shown in FIGS. 29 and 30, the elastic partition wall 27 is not provided with the recessed section, but solid. Since the entire end wall 21 is formed in a single disk shape and the elastic partition wall 27 is compressed in the central direction when assembled, it is possible to raise the spring value in the lateral direction.

Further, by providing the interference d and adjusting it, the spring value in the lateral direction can be selectively set. Accordingly, it is possible to freely control the spring ratio to realize an ideal spring ratio in each direction, i.e. in the vertical direction, the front and rear direction, and the lateral direction. Still further, by press-fitting the end section of the elastic partition wall 27 to the seat section, it is possible to improve the fluid-sealing performance at a section where the fluid chamber cover 22 and the elastic partition wall 27 joint.

As shown in FIG. 10, it is possible to support the end portion of the elastic partition wall 27 by a tapered seat section and change non-linearly the spring constant. Also, it is to be noted that the spring ratio control in two direction according to the present embodiment is not limited to the embodiments described above, but can be applied to various deformations or applications within the principle of the invention. For example, the present invention is effective for the fluid-sealed anti-vibration device in which the cone-shaped mounting section 1 is not provided, but only the cylindrical bushing section 2 is provided. In this case, it is possible to control the spring ratio in two directions, i.e. the front and rear direction and the lateral direction, in such a use condition as seen in each embodiment above.

Further, it is to be noted that the cylindrical bushing section 2 can be selectively situated. For example, the cross-sectional direction of the elastic partition wall 27 in FIG. 7 can be arranged toward the front and rear direction or the vertical direction of the car body. In this case, it is natural that the spring ratio be different from above.

Still further, the seat section can be provided on the first connecting member 3 side, and the elastic partition wall 27 can be press-fitted on the first connecting member 3 side. It is also possible to form the elastic partition wall 27 separately from the elastic body member 7 to allow the elastic partition wall 27 to be press-fitted on each side of the first connecting member 3 and the second connecting member 5.

What is claimed is:

1. A fluid-sealed anti-vibration device for damping vibrations occurring in first, second and third mutually orthogonal directions between a vibration-generating member and a vibration-receiving member, the anti-vibration device comprising:

1) a first mounting section for damping vibrations occurring in the first direction, the first mounting section having a natural resonant frequency that yields a dynamic spring constant having maximum and minimum values at different frequencies, the first mounting section comprising:
   a) a first connecting member secured to one of the vibration-generating and vibration-receiving members;
   b) a second connecting member secured to the other of the vibration-generating and vibration-receiving members;
   c) an elastic body connecting the first and second connecting members, the elastic body including a substantially cone-shaped elastic wall member; and
   d) a first fluid chamber bounded in part by the cone-shaped elastic wall member, the fluid chamber (1) being divided by a partition member into a main fluid chamber and an auxiliary fluid chamber and (2) having a first passage providing communication between the main fluid chamber and the auxiliary chamber;

2) a second mounting section for damping vibrations occurring in the second and third directions, the second mounting section having a natural resonant frequency that yields a dynamic spring constant having maximum and minimum values at different frequencies, the second mounting device comprising:
   a) a plurality of second fluid chambers bounded in part by the cone-shaped elastic wall, the second fluid chambers (1) together defining a volume sealed against ingress and egress of fluid and containing a fixed quantity of fluid and (2) being arranged circumferentially at predetermined intervals about a central portion of the elastic body; and
   b) a second passage providing communication between the second fluid chambers; and the natural resonant frequencies of the first and second mounting sections are selected so that the minimum value for the dynamic spring constant occurs in one of the mounting sections at a frequency near to a frequency that yields the maximum value for the dynamic spring constant in the other of the mounting sections, whereby coupling of the dynamic spring constants of the first and second mounting sections occurs, and a low dynamic spring constant and enhanced damping properties of the anti-vibration device over an extended frequency range are realized.

2. The fluid-sealed anti-vibration device according to claim 1, wherein an elastic membrane for absorbing the fluctuations in the internal pressure in the main fluid chamber is provided, exposed to fluid in the main fluid chamber of the first mounting section.

3. The fluid-sealed anti-vibration device according to claim 2, wherein a disc member which moves together with the first connecting member is provided within the main fluid chamber of the first mounting section.

4. The fluid-sealed anti-vibration device according to claim 1, wherein a disc member which moves together with the first connecting member is provided within the main fluid chamber of the first mounting section.

5. The fluid-sealed anti-vibration device according to claim 1, wherein:
   the first mounting section has a natural resonant frequency that yields the minimum dynamic spring constant at a first frequency;
   the second mounting section has a natural resonant frequency that yields maximum and minimum dynamic spring constants at second and third frequencies, respectively;
   the first frequency is near to and less than the second frequency; and
   the second frequency is less than the third frequency.

6. The fluid-sealed anti-vibration device according to claim 5, wherein an elastic membrane for absorbing the fluctuations in the internal pressure in the main fluid chamber is provided, exposed to fluid in the main fluid chamber of the first mounting section.

7. The fluid-sealed anti-vibration device according to claim 5, wherein a disc member which moves together with the first connecting member is provided within the main fluid chamber of the first mounting section.

8. The fluid-sealed anti-vibration device according to claim 1, wherein:
   the first mounting section has a natural resonant frequency that yields the minimum dynamic spring constant at a first frequency;
   the second mounting section has a natural resonant frequency that yields the maximum dynamic spring constant at a second frequency; and
   the first frequency is near to and greater than the second frequency.

9. The fluid-sealed anti-vibration device according to claim 8, wherein an elastic membrane for absorbing the fluctuations in the internal pressure in the main fluid chamber is provided, exposed to fluid in the main fluid chamber of the first mounting section.

10. The fluid-sealed anti-vibration device according to claim 8, wherein a disc member which moves together with the first connecting member is provided within the main fluid chamber of the first mounting section.

11. The fluid-sealed anti-vibration device according to claim 1, wherein:
    one of the connecting members is tubular and extends about the other connecting member and the elastic body;
    the second mounting section comprises (1) three pairs of second fluid chambers separated by elastic partition walls and (2) three second passages providing communication between the second fluid chambers of each pair; and wherein each of the three second passages exhibits flow characteristics that are different from the flow characteristics of the other second passages.

12. The fluid-sealed anti-vibration device according to claim 11, wherein:

each of the second passages exhibits a liquid column resonance frequency;

one of the second passages is provided as a damping passage; and the liquid column resonance frequencies of the other second passages are set near to the liquid column resonance frequency of the damping passage.

13. The fluid-sealed anti-vibration device according to claim 11, wherein:

each of the second passages exhibits a liquid column resonance frequency;

one of the second passages is provided as a damping passage;

another one of the second passages is provided as an idle passage; and the liquid column resonance frequency of the remaining passage is set at a frequency where a dynamic spring constant of the idle orifice passage becomes the maximum.

14. The fluid-sealed anti-vibration device according to claim 11, wherein:

one of the second passages exhibits a fluid flow rate that is greater than the fluid flow rate of the other second passages;

the liquid column resonance frequency of the one second passage is set lower than the liquid column resonance frequency of the other second passages.

15. The fluid-sealed anti-vibration device according to claim 11, wherein:

one of the second passages exhibits a fluid flow rate that is greater than the fluid flow rate of the other second passages;

the liquid column resonance frequency of the one second passage is set higher than the liquid column resonance frequency of the other second passages.

16. The fluid-sealed anti-vibration device according to claim 1, wherein:

the second connecting member is tubular and extends about the first connecting member and the elastic body;

the second fluid chambers are separated by an elastic partition wall extending along one of the second and third directions and installed between the first and second connecting members with a press fit that compresses the; elastic partition wall whereby a spring value of the anti-vibration device in the second and third directions can be set at the time of assembly to a by setting the amount of compression of the elastic partition wall between the first and second connecting members.

17. The fluid-sealed anti-vibration device according to claim 16, and further comprising:

a seat section to which the elastic partition wall is press-fitted, the seat section including a projecting section that is spaced from the elastic partition wall when the elastic partition wall is not deformed by vibrations applied to the anti-vibration device, the projecting section adapted to engage a press-fitted end of the elastic partition wall when the elastic partition wall is deformed by vibrations applied to the anti-vibration device.

* * * * *